United States Patent
Guan et al.

(10) Patent No.: US 9,070,054 B2
(45) Date of Patent: Jun. 30, 2015

(54) EDITING PROCESS FOR CREATING PRINTED MATTER, RECORDING MEDIUM AND PRINTER THEREFOR

(71) Applicant: Brother Kogyo Kabushiki Kaisha, Nagoya, Aichi-ken (JP)

(72) Inventors: Shanshan Guan, Nagoya (JP); Tomoki Miyashita, Nagoya (JP); Keigo Kako, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/337,686

(22) Filed: Jul. 22, 2014

(65) Prior Publication Data
US 2015/0022831 A1 Jan. 22, 2015

(30) Foreign Application Priority Data
Jul. 22, 2013 (JP) ................................. 2013-152006

(51) Int. Cl.
*H04N 1/00* (2006.01)
*G06K 15/02* (2006.01)
*G06K 15/00* (2006.01)
*B41J 3/407* (2006.01)

(52) U.S. Cl.
CPC ............ *G06K 15/022* (2013.01); *G06K 15/005* (2013.01); *B41J 3/4075* (2013.01)

(58) Field of Classification Search
USPC ................................................ 358/1.1–3.29
See application file for complete search history.

(56) References Cited

U.S. PATENT DOCUMENTS

2005/0012950 A1* 1/2005 Kurashina .................... 358/1.12

FOREIGN PATENT DOCUMENTS

JP 2001-042854 A 2/2001
JP 2013-111843 A 6/2013

OTHER PUBLICATIONS

Abstract of JP Pub.2001042854, Terada Toshihito, Feb. 16, 2001, Table Display Controller, Table Display Control Method.*
Abstract of JP Pub.2013111843, Okuhara, Kenji, Oct. 6, 2013, Label Generation Apparatus, Label Generation System.*

* cited by examiner

*Primary Examiner* — Marcellus Augustin
(74) *Attorney, Agent, or Firm* — Banner & Witcoff, Ltd.

(57) ABSTRACT

This disclosure discloses a non-transitory computer-readable recording medium storing a printed matter production processing program for executing steps. The steps comprise an edition-screen display step, a database display step, a region-specification reception step, and a print-object arrangement step. In the edition-screen display step, an edition screen is displayed for receiving an input operation of the print object to be arranged in each of at least one block. In the database display step, a database that is stored in the memory and includes plurality of records is displayed. In the region-specification reception step, specification of a character-string including region is received. The character-string including region includes a plurality of character strings to be allocated as print objects. In the print-object arrangement step, the plurality of character strings included in the character-string including region are allocated to each of the block in accordance with a desired allocation rule.

6 Claims, 17 Drawing Sheets

FIG. 7A
(DATABASE) 300

| record number | field 1 | field 2 | field 3 | ... |
|---|---|---|---|---|
| 001 | AA | B | 10 | ... |
| 002 | AB | B | 20 | ... |
| 003 | AC | B | 30 | ... |
| ... | ... | ... | ... | ... |
| 009 | AI | B | 90 | ... |
| ... | ... | ... | ... | ... |

| record number | field 1 | field 2 | field 3 | ... |
|---|---|---|---|---|
| 001 | AA | B | 10 | ... |
| 002 | AB | B | 20 | ... |
| 003 | AC | B | 30 | ... |
| ... | ... | ... | ... | ... |
| 009 | AI | B | 90 | ... |
| ... | ... | ... | ... | ... | w

FIG. 8A
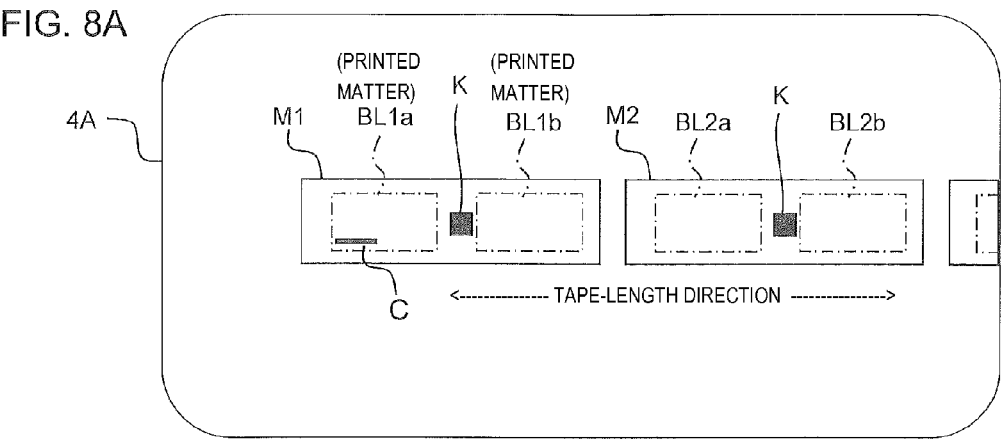
FIG. 8B
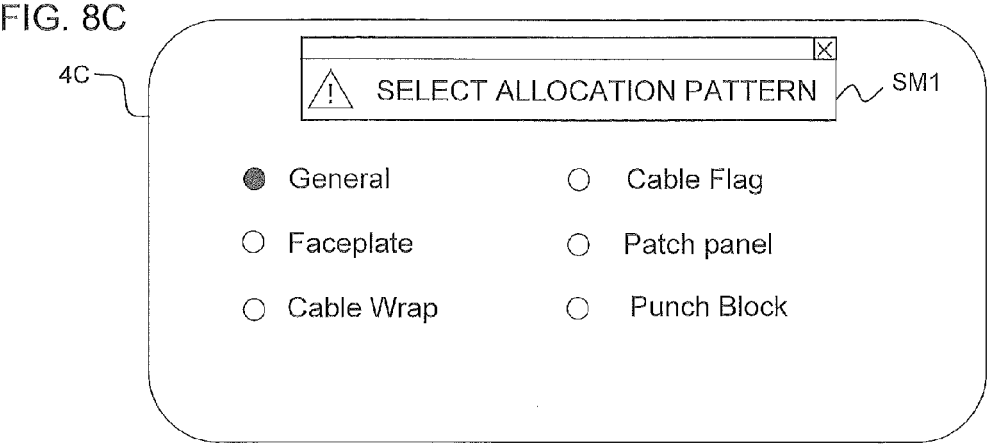
FIG. 8C
| SELECT ALLOCATION PATTERN | SM1 |
● General   ○ Cable Flag
○ Faceplate   ○ Patch panel
○ Cable Wrap   ○ Punch Block FIG. 10A General
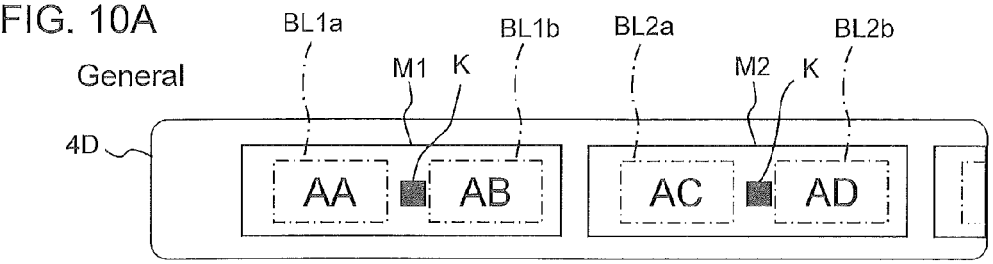
FIG. 10B Faceplate
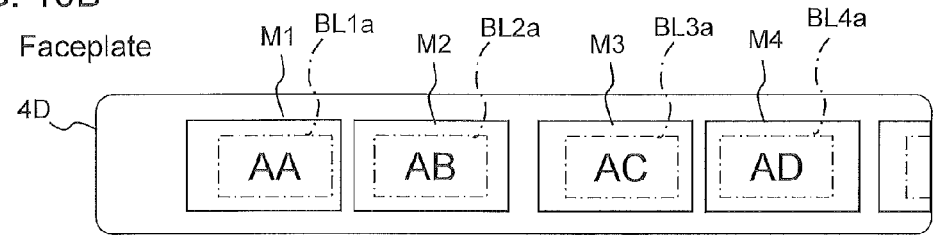
FIG. 10C Cable Wrap
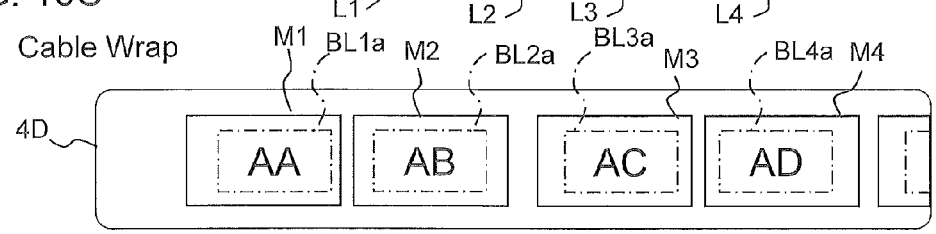
FIG. 10D Cable Flag 1
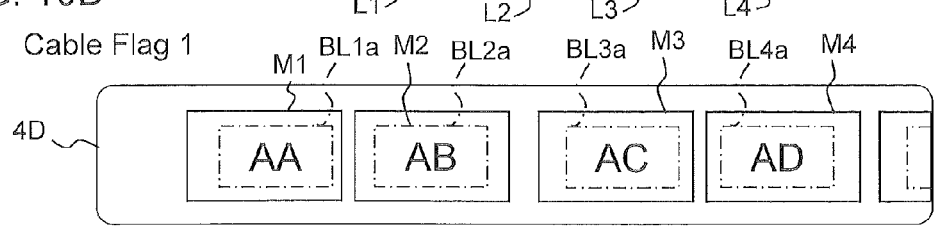
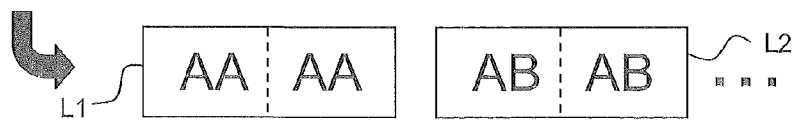

Cable Flag 2

Patch panel

Punch Block

FIG.15A

| record number | field 1 | field 2 | field 3 | ... |
|---|---|---|---|---|
| 001 | AA | B | 10 | ... |
| 002 | AB | B | 20 | ... |
| 003 | AC | B | 30 | ... |
| 004 | AD | B | 40 | ... |
| ... | ... | ... | ... | ... |

FIG.15B

| record number | field 1 | field 2 | field 3 | ... |
|---|---|---|---|---|
| 001 | AA → | B | 10 | ... |
| 002 | AB → | B | 20 | ... |
| 003 | AC → | B | 30 | ... |
| 004 | AD → | B | 40 | ... |
| ... | ... | ... | ... | ... |

FIG. 16A
General
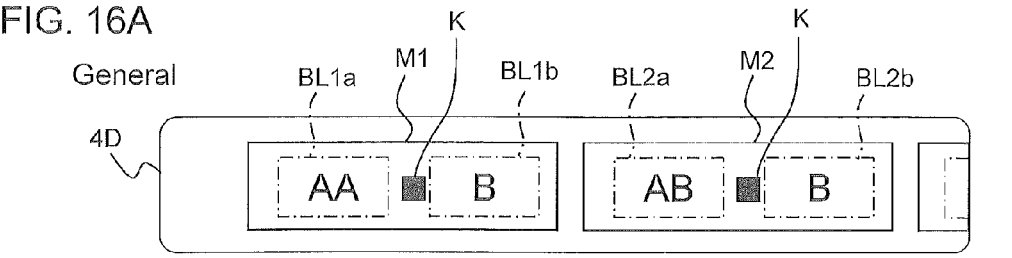
FIG. 16B
Faceplate
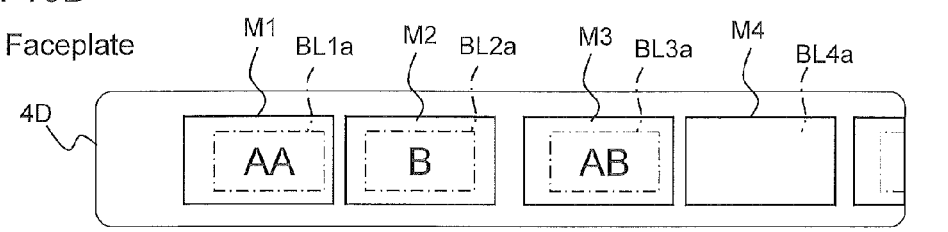
FIG. 16C
Cable Wrap
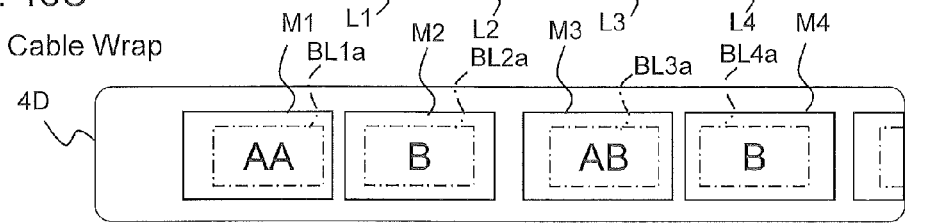
FIG. 16D
Cable Flag 1
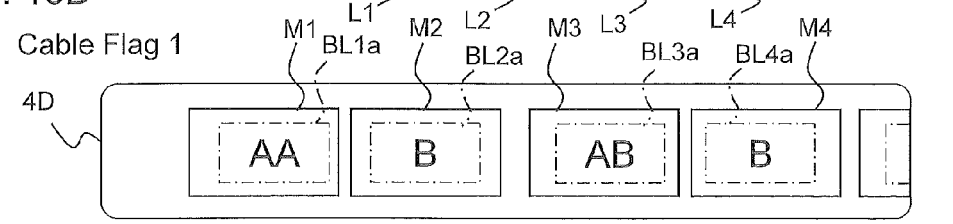
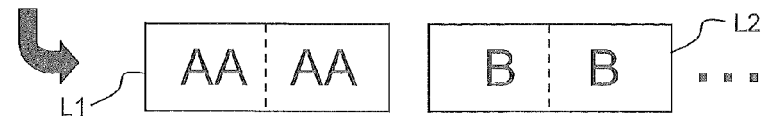

EDITING PROCESS FOR CREATING PRINTED MATTER, RECORDING MEDIUM AND PRINTER THEREFOR

CROSS-REFERENCE TO RELATED APPLICATION

The present application claims priority from Japanese Patent Application No. 2013-152006, which was filed on Jul. 22, 2013, the disclosure of which is incorporated herein by reference in its entirety.

BACKGROUND

The present disclosure relates to a recording medium storing a printed matter production processing program for producing a printed matter and a printer using the above described program.

DESCRIPTION OF THE RELATED ART

In prior arts, there is already known a technique for specifying a content in a character string printed and formed in a printed matter to be produced, using records in a database, that is, for performing so-called database printing. With this technique, an operator can sequentially produce the printed matter in which record content in the database is printed and formed as it is.

According to the prior art, in a display screen of a label producing apparatus, a plurality of character strings included in records of the above described database is allocated along a desired allocation rule. However, since the character strings cannot be changed after the allocation, needs for further editing and changing the allocated character string cannot be satisfied.

SUMMARY

The object of the present disclosure is to provide a recording medium storing a printed matter processing program that can make it possible to further edit a character string after being allocated from the database when database printing is performed and to improve convenience of an operator, and is to provide a printer using the above described program.

In order to achieve the above-described object, according to the aspect of the present application, there is provided a non-transitory computer-readable recording medium, storing a printed matter production processing program for executing steps on a computing device disposed in a printing processing apparatus that includes a display device, an operation device, and a memory storing database including a plurality of records in which character string data is allocated to each of a plurality of fields and performs print of at least one of a desired print object on a print-receiving tape to perform processing for creating a printed matter, the steps comprising an edition-screen display step for controlling the display device to display an edition screen for receiving an input operation of the print object to be arranged in each of at least one block that can be set along a tape-length direction with respect to one the printed matter, a database display step for controlling the display device to display the database that is stored in the memory and includes the plurality of records, a region-specification reception step for, in the database displayed in the database display step, receiving specification of a character-string including region including a plurality of character strings to be allocated as the print object related to a plurality of the printed matters on the edition screen, and a print-object arrangement step for arranging the print object related to each of the plurality of printed matters on the edition screen by allocating the plurality of character strings included in the character-string including region, the specification of which has been received in the region-specification reception step, to each of the block related to the plurality of printed matters in accordance with a desired allocation rule.

BRIEF DESCRIPTION OF THE DRAWING

FIG. 7A is an illustration indicating an example of database.

FIG. 7B is an illustration indicating an example of an area specification of the database.

FIG. 8A is an illustration indicating an initial setting screen displayed on a liquid crystal display unit.

FIG. 8B is an illustration indicating a database display screen displayed on a liquid crystal display unit.

FIG. 8C is an illustration indicating an allocation pattern selection screen displayed on a liquid crystal display unit.

FIG. 10A is an illustration indicating a various type of allocation pattern.

FIG. 10B is an illustration indicating a various type of allocation pattern.

FIG. 10C is an illustration indicating a various type of allocation pattern.

FIG. 10D is an illustration indicating a various type of allocation pattern.

FIG. 15A is an illustration indicating an example of database in a modification example in which a region in a different mode is specified.

FIG. 15B is an illustration indicating an example of an area specification in the database in the modification example in which a region in a different mode is specified.

FIG. 16A is an illustration indicating a various type of allocation pattern.

FIG. 16B is an illustration indicating a various type of allocation pattern.

FIG. 16C is an illustration indicating a various type of allocation pattern.

FIG. 16D is an illustration indicating a various type of allocation pattern.

DETAILED DESCRIPTION OF THE PREFERRED EMBODIMENTS

With reference to diagrams, an embodiment according to the present disclosure will be described below. In following descriptions, when "up", "down", "front", "back", and "width" are described about a label producing apparatus 1, each of them corresponds to an arrow direction appropriately indicated in diagrams such as FIG. 1, and when "thickness" is described about the label producing apparatus 1, the thickness in a front and back direction is indicated.

<Entire Configuration of Label Producing Apparatus>

Figure 1:
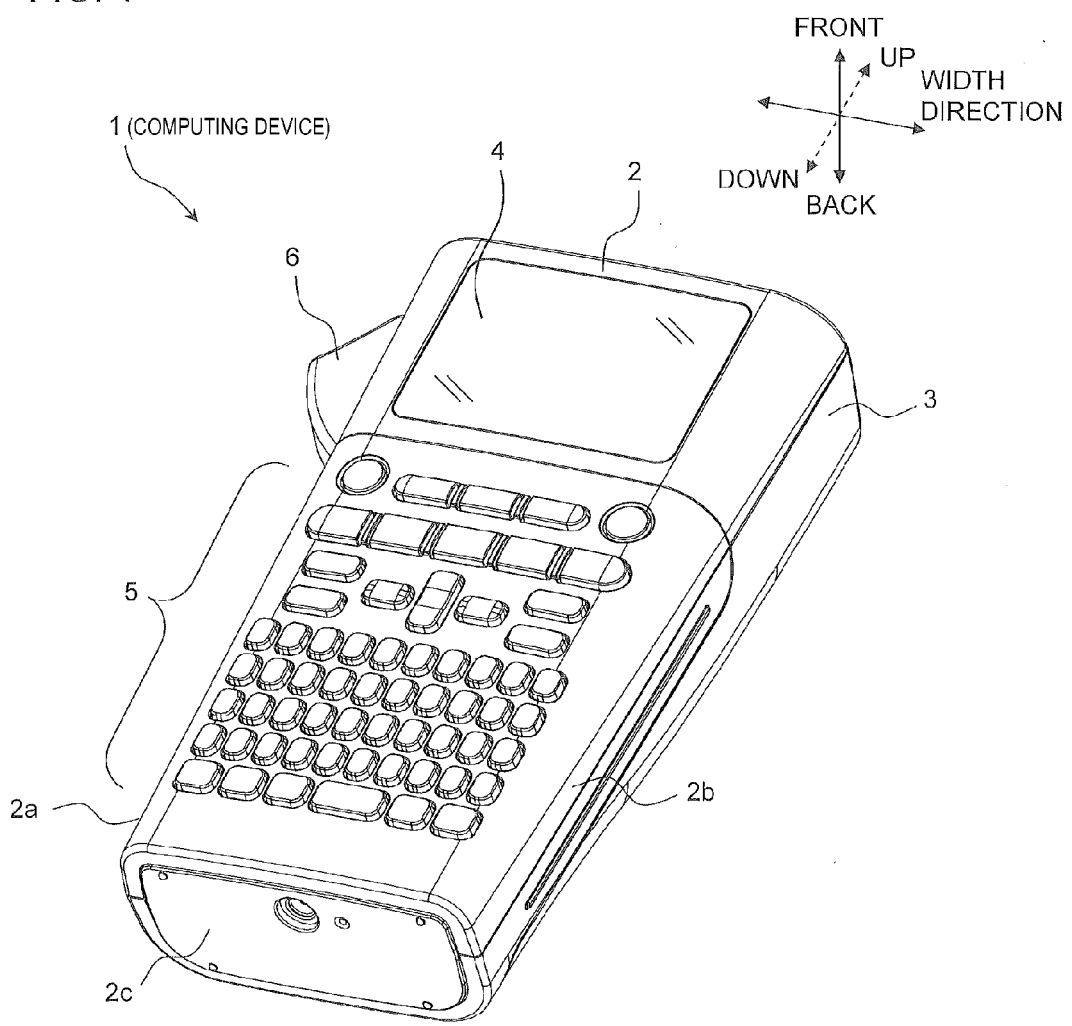
FIG. 1 is a perspective view illustrating an outer appearance of a label producing apparatus at a front side thereof according to a first embodiment of the present disclosure.
Figure 2:
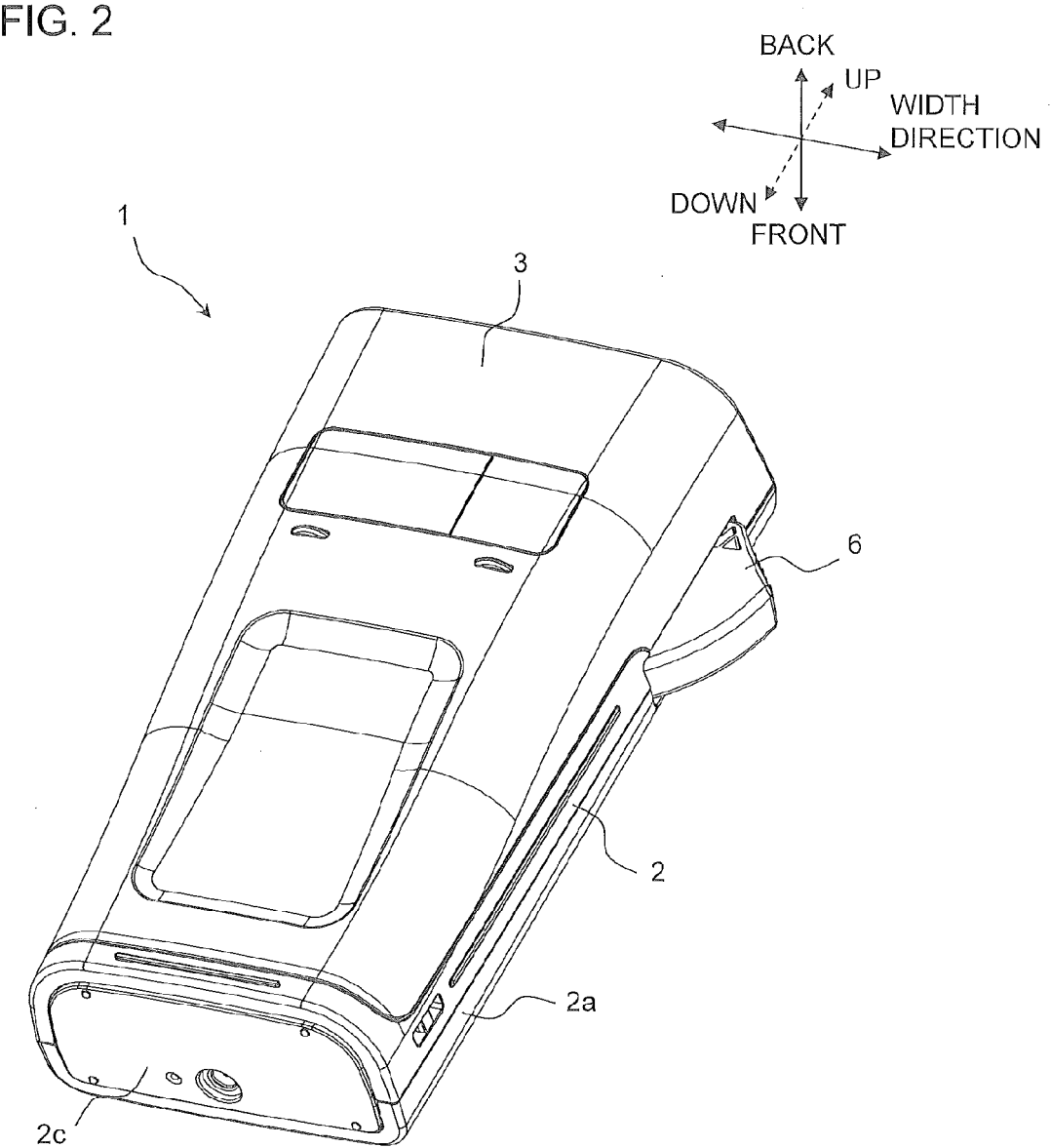
FIG. 2 is a perspective view illustrating an outer appearance of the label producing apparatus at a back side thereof according to the first embodiment of the present disclosure.

As illustrated in FIGS. 1 and 2, the label producing apparatus 1 (a printer, corresponding to a printing processing apparatus) is electronic equipment of a hand-held type that can be held by an operator's hand. The label producing apparatus 1 includes an apparatus main body 2 and a cover 3 that can be removably attached on a surface of a back portion of the apparatus main body 2.

The apparatus main body 2 has a flat and substantially cuboid shape that is thin and long in an up and down direction. A liquid crystal display unit 4 (corresponding to a display device) for displaying print data, a setting screen or the like is disposed on an upper portion of a front face of the apparatus main body 2 and, on the lower side of the liquid crystal display unit 4, a keyboard unit 5 (corresponding to an operation device) for operating the label producing apparatus 1 is disposed. In the keyboard unit 5, a group of keys including character keys for characters, symbols, and numbers, and various types of function keys are disposed. Further, on an upper portion of a side wall portion 2a at one side in a width direction of the apparatus main body 2 (a left side in FIG. 1 and a right side in FIG. 2), a cutting operation lever 6 for cutting a label tape with print (described below) is disposed.

<Cover Configuration>

Figure 3:
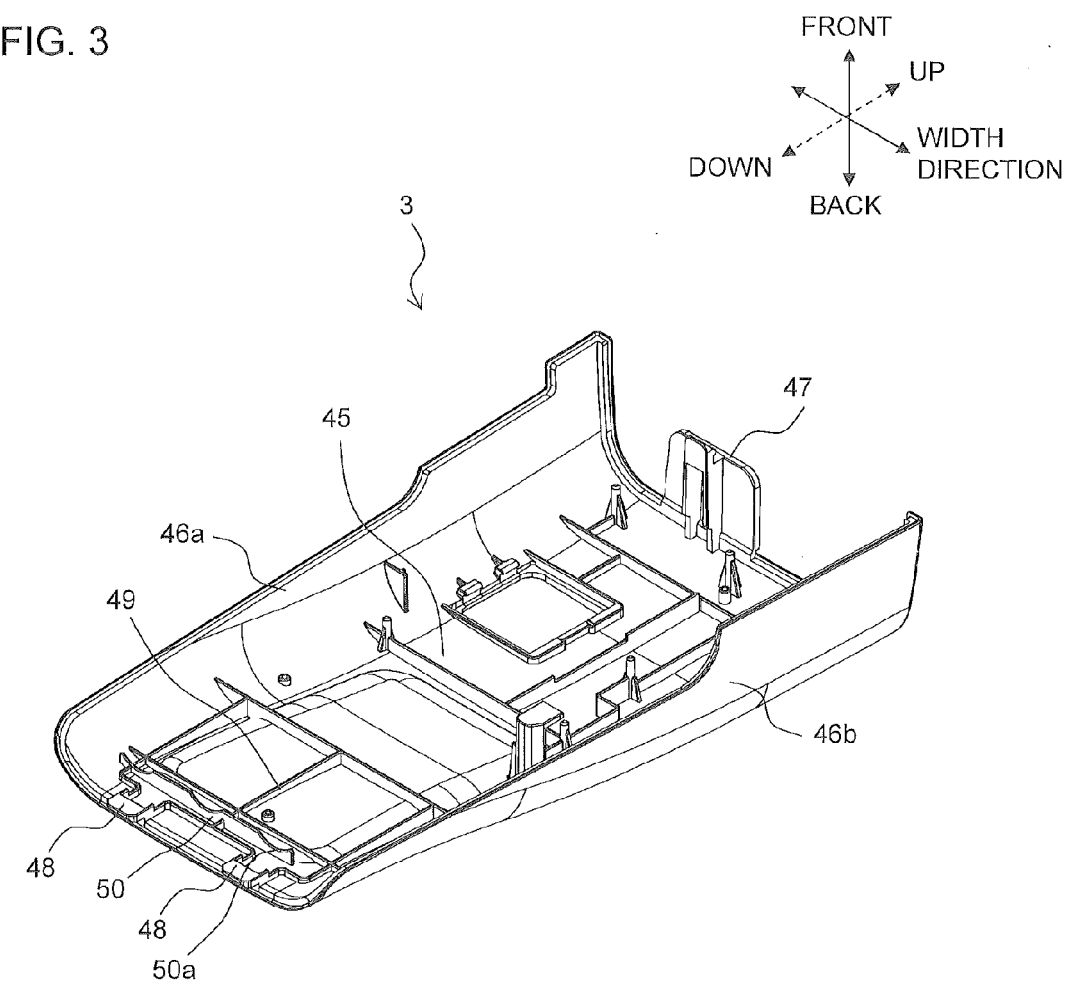
FIG. 3 is a perspective view illustrating a configuration of an inside of a cover.

FIG. 3 illustrates a configuration of an inside of the cover 3. As illustrated in FIG. 3, the cover 3 includes a bottom portion 45, a side face portion 46a erected at one side in the width direction of the bottom portion 45 (an upper-left side in FIG. 3), and a side face portion 46b erected at the other side in the width direction (a lower-right side in FIG. 3). The cover 3 is formed in a substantially U-shape when viewed from a side face in the up and down direction. At an upper edge portion of the bottom portion 45, a protruding piece 47 erected in a thickness direction of the apparatus main body 2 from a substantially center portion is formed. The side face portion 46a at the one side in the width direction is formed in a step shape in which height of the side face portion 46a in an erected direction (same as a front and back direction) is gradually decreased in three steps from the upper edge portion to a lower edge portion. In a similar manner, the side face portion 46b at the other side in the width direction is formed in the step shape in which the height of the side face portion 46b in the erected direction is gradually decreased in two steps from the upper edge portion to the lower edge portion.

At a lower edge of the bottom portion 45 of the cover 3, an insertion piece 48, which is inserted into an engagement hole 2c1 (refer to FIG. 4 described below) provided on two points in a width direction of the lower portion 2c of the apparatus main body 2, is disposed on two points in the width direction, when the cover 3 is mounted onto a back face portion of the apparatus main body 2.

Further, on a lower portion of the bottom portion 45 of the cover 3, there are erected a first rib 49 in a rectangular frame shape assembled in the width direction and the up and down direction of the apparatus main body 2, and a second rib 50 that is disposed on a further downside of and close to the apparatus main body 2 and has a cutout 50a in a circular-arc shape at three points in the width direction. Heights of the ribs 49, 50 are set such that the height of the upper edge of the first rib 49 in the erected direction and the height of the circular-arc center portion of the cutout 50a of the second rib 50 in the erected direction are substantially the same.

The first rib 49 is abut and pressed onto a surface of a rechargeable battery when the rechargeable battery (not illustrated) is stored in a battery storage unit 30 (refer to FIGS. 4, 5 described below) and the cover 3 is mounted onto the back face portion of the apparatus main body 2.

To mount the cover 3 onto the back face portion of the apparatus main body 2, the two insertion pieces 48 at the lower edge of the cover 3 are inserted into the two engagement holes 2c1 at the lower portion 2c of the apparatus main body 2, and the protruding piece 47 at the upper edge of the cover 3 is inserted into and engaged with an engagement opening portion 9 (refer to FIG. 4 described below) at the upper edge of the apparatus main body 2. With this arrangement, the cover 3 is mounted onto the back face portion of the apparatus main body 2, and thus the cover 3 covers a label production unit 10 and the battery storage unit 30 of the apparatus main body 2 (refer to FIG. 4 described below).

<Label Production Mechanism of Label Producing Apparatus>

Figure 4:
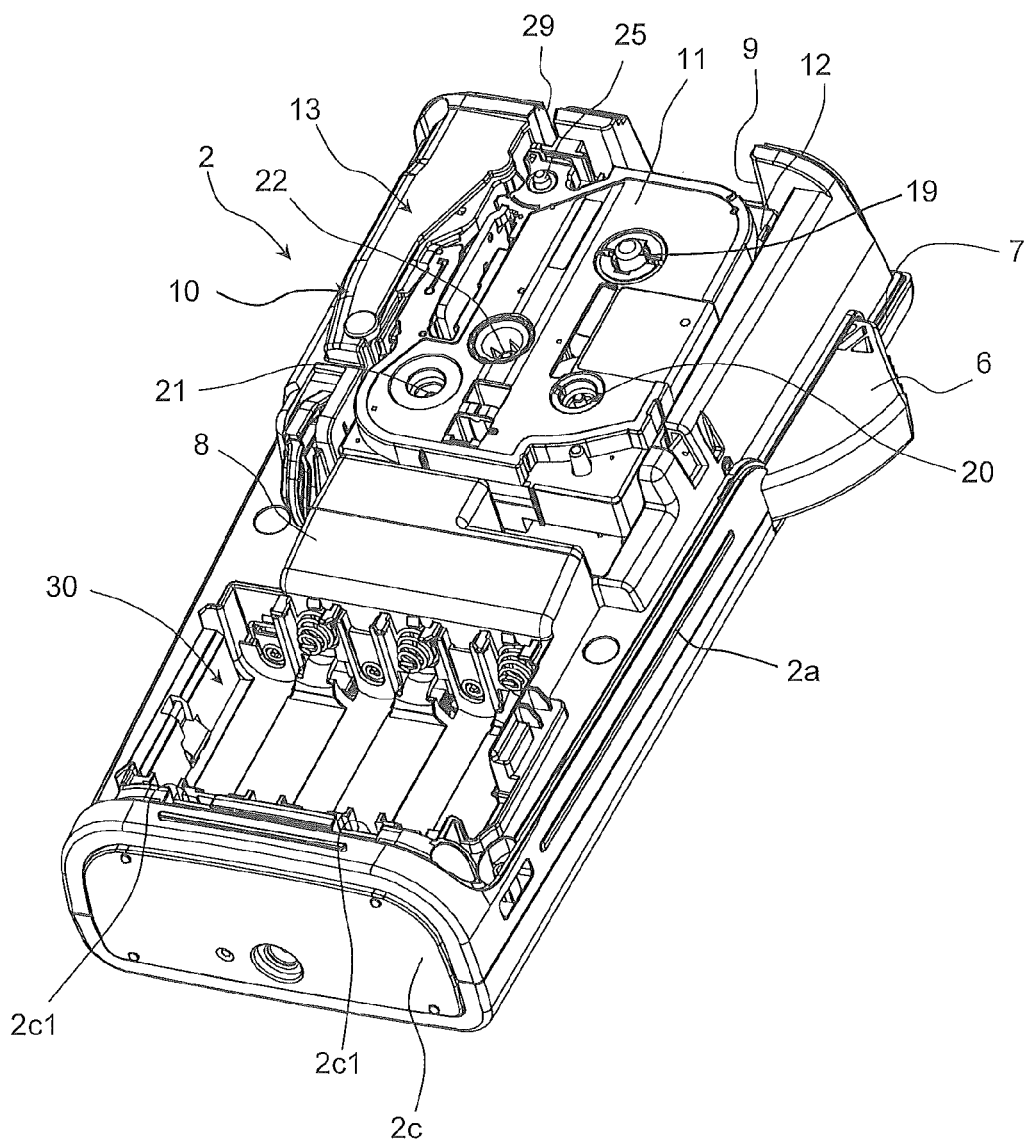
FIG. 4 is a perspective view illustrating an internal configuration of an apparatus main body at the back side thereof without batteries stored.
Figure 5:
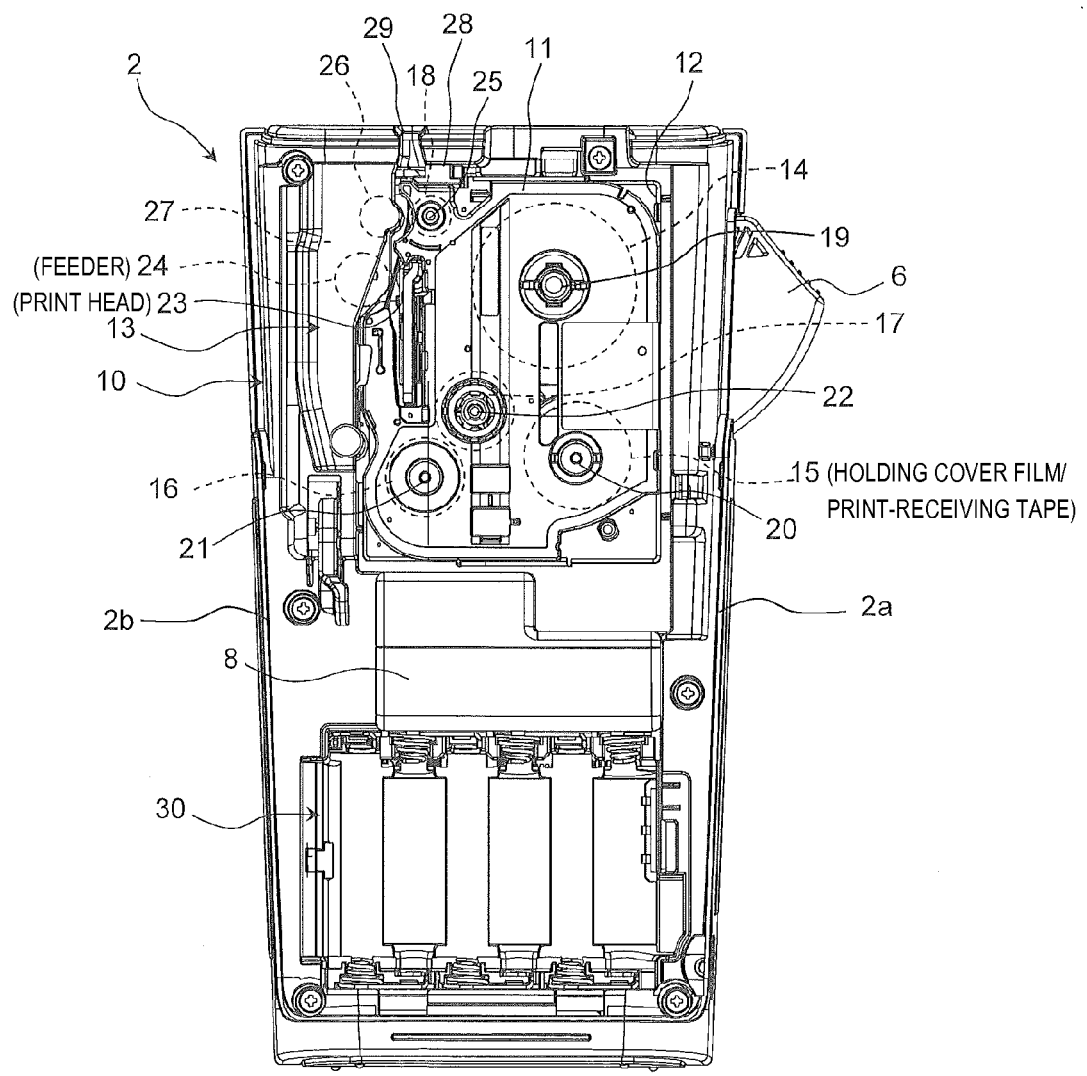
FIG. 5 is a plan view illustrating the internal configuration of the apparatus main body at the back side thereof without batteries stored.

As illustrated in FIGS. 4, 5, the apparatus main body 2 includes the label production unit 10 and the battery storage unit 30. The label production unit 10 and the battery storage unit 30 are segmented by a storage unit 8 storing a control substrate (not illustrated) and a motor 63a (refer to FIG. 6 described below) for driving a platen roller 24 described below. Further, as illustrated in FIGS. 4, 5, on side wall portions 2a, 2b at the one side and the other side in the above described width direction of the apparatus main body 2, step portions 7 each having a shape corresponding to an edge portion of an opening side of the cover 3 are disposed. On the upper edge of the apparatus main body 2, the engagement opening portion 9 is provided.

The label production unit 10 includes a cartridge holder 12 in a recessed shape for removably mounting a cartridge 11 provided in a substantially most part of an upper half portion of the apparatus main body 2, and a printing and feeding mechanism 13 provided on a region including the other side (left side in FIGS. 4, 5) of the cartridge holder 12 in the width direction. As illustrated in FIG. 5, the cartridge 11 includes therein a base tape roll 14, a cover-film roll 15, an ink-ribbon roll 16, an ink-ribbon take-up roller 17, and a feeding roller 18.

The printing and feeding mechanism 13 includes a support axis 19 of the base tape roll 14, a support axis 20 of the cover-film roll 15, a support axis 21 of the ink-ribbon roll 16, an ink-ribbon take-up axis 22, a thermal head 23, a platen roller 24 (corresponding to a feeding device), a drive axis 25 of the feeding roller 18, and a pressing roller 26. The platen roller 24 and the pressing roller 26 are mounted to the roll holder 27, and can be switched, by a sliding movement of the roll holder 27, between the printing and feeding position (position illustrated in FIG. 5) to contact the thermal head 23 (corresponding to the printer) and the feeding roller 18 respectively and a waiting position (not illustrated) to be separated from the thermal head 23 and the feeding roller 18.

When a print label is produced, the platen roller 24 and the pressing roller 26 are switched to the printing and feeding position. The platen roller 24 switched to the printing and feeding position is rotated by driving of the motor 63a at a side of the apparatus main body 2, and a cover film (corresponding to a print-receiving tape, not illustrated) fed out from the cover-film roll 15 and the ink ribbon (not illustrated) fed out from the ink-ribbon roll 16 are pressed onto the thermal head 23. With this arrangement, the thermal head 23 performs desired print according to print data on the cover film, and the platen roller 24 feeds the cover film and the ink ribbon that have finished print to the feeding roller 18. The ink ribbon that has finished the print is subsequently separated from the cover film and taken up by the ink-ribbon take-up roller 17.

On the other hand, the pressing roller 26 switched to the printing and feeding position presses the cover film that is fed by the platen roller 24 and has finished the print and a base tape (not illustrated) fed out from the base tape roll 14 onto the feeding roller 18 rotated by the driving of the drive axis 25 connected to the motor 63a (refer to FIG. 6 described below). With this arrangement, while the cover film that has finished the print and the base tape are bonded to each other to form the label tape with print, the feeding roller 18 feeds the label tape with print to a label discharging exit 29 provided on the upper edge of the apparatus main body 2. At a predetermined time point, when the label tape with print is discharged via the label discharging exit 29, the operator manually operates the cutting operation lever 6 so that a cutter 28 disposed close to the label discharging exit 29 acts to cut the label tape with print to form print labels L1, L2, and the subsequent print labels in a desired length (corresponding to the printed matter, refer to FIG. 9B described below).

The battery storage unit 30 is formed as a long recessed portion in a substantially rectangular shape in the width direction of the apparatus main body 2 in a planar view, and a plurality of (according to this example, six) batteries in a cylindrical shape (not illustrated) or one rechargeable battery (e.g., lithium ion battery pack, not illustrated) in a cuboid shape can be selectively stored.

<Control System of Label Producing Apparatus>

Figure 6:
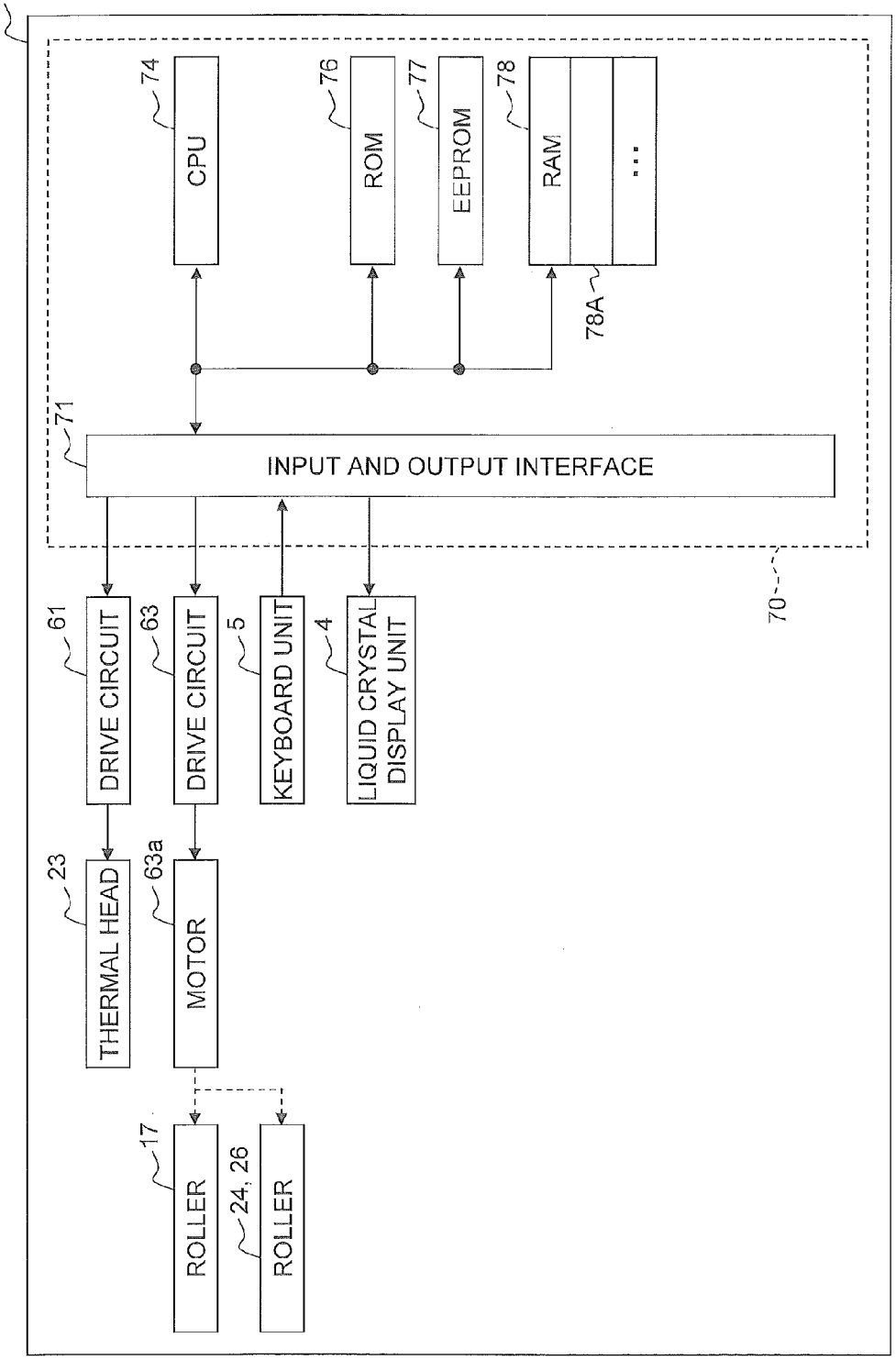
FIG. 6 is a functional block diagram illustrating a control system of the label producing apparatus.

With reference to FIG. 6, a control system of the label producing apparatus 1 will be described below.

As illustrated in FIG. 6, a control circuit 70 is disposed on a control substrate (not illustrated) of the label producing apparatus 1. The control circuit 70 includes a CPU 74 (corresponding to a computing device), and the CPU 74 is connected with a ROM 76, a RAM 78, an EEPROM 77 (corresponding to a storage device), and an input and output interface 71 via a data bus. In place of the EEPROM 77, a non-volatile memory such as a flash memory may be used.

The ROM 76 stores various types of programs (e.g., a printed matter production processing program according to the present embodiment for executing each step of flows in FIGS. 12, 13 and 14 described below) required by the label producing apparatus 1 to execute control. The CPU 74 executes various types of computing based on various types of programs stored in the ROM 76.

The RAM 78 temporarily stores various types of computing results executed by the CPU 74. The RAM 78 includes a label image memory 78A and the like.

The EEPROM 77 stores various types of information such as database described below.

The input and output interface 71 is connected with a thermal head driving circuit 61, a motor driving circuit 63, the above described keyboard unit 5, the above described liquid crystal display unit 4, and a cartridge sensor 64 and the like.

The thermal head driving circuit 61 drives the above described thermal head 23.

The motor driving circuit 63 drives the above described motor 63a to rotate the above described ink-ribbon take-up roller 17 via a gear (not illustrated). Further, rotation of the gear is transmitted to a platen roller gear and a pressing roller gear (not illustrated). When the platen roller gear and the pressing roller gear are rotated, the above described platen roller 24 and the pressing roller 26 are rotated accordingly.

In the control system centering on such a control circuit 70, when the operator inputs a predetermined label production instruction via the keyboard unit 5, the platen roller 24 and the pressing roller 26 and the like are driven via the motor driving circuit 63 and the motor 63a to feed the cover film or the like. Further, in synchronization with the above described operation, a plurality of heating elements of the thermal head 23 is selectively heated and driven via the thermal head driving circuit 61 to perform the print of the print object on the above described cover film being fed. With this arrangement, finally, the print labels L1, L2, and subsequent labels with the print object formed on the cover film are produced.

<Feature of Embodiment>

The feature of the present embodiment in the above described configuration is included in a method of database printing. The details will be described in turn below.

<Database Including Plurality of Records>

According to the present embodiment, the above described EEPROM 77 stores database 300 including a plurality of records. FIG. 7 illustrates an example of the database 300.

In FIG. 7A, according to the database 300 of the example, a data group in one lateral row is defined as one record, and in each record (record numbers "001", "002", and subsequent record numbers), each field of a first field 320, a second field 330, a third field 340 and the like includes one or a plurality of character strings.

For example, as illustrated in FIG. 7A, in the record (record number "001") of a first line in the database 300, a character string "AA" is described in the first field 320, a character string "B" is described in the second field 330, and a character string "10" is described in the third field 340.

In a similar manner, in the record (record number "002") of a second line, a character string "AB" is described in the first field 320, a character string "B" is described in the second field 330, and a character string "20" is described in the third field 340. In a similar manner, in the record (record number "003") of a third line, a character string "AC" is described in the first field 320, a character string "B" is described in the second field 330, and a character string "30" is described in the third field 340. Further, in a similar manner, in the record (record number "009") of a ninth line, a character string "AI" is described in the first field 320, a character string "B" is described in the second field 330, and a character string "90" is described in the third field 340.

In such a database 300 including the above described content, when the above described database printing is performed, of the character strings included in the records in the database 300, the region including the character string desired to be printed and formed is specified by the operator. In other words, according to this example illustrated in FIG. 7B for example, in the database 300, a region "W" (corresponding to the character-string including region) including the plurality of character strings which the operator desires to print and form is specified. According to this example, the character strings "AA", "AB", "AC"-"AI" of the first field 320 included respectively in the records having the record numbers "001"-"009" are specified as the print content in the print formation. Each character string of "AA"-"AI" in the region "W" is sequentially extracted in a predetermined order, and allocated in each edition screen along a desired allocation pattern (allocation rule) (details will be described below). According to this example, toward the lower side of the database (in other words, in an order along a direction in which the record number is increased in the same field, refer to a broken-line arrow in FIG. 7B), the character strings are extracted in an order of the character strings "AA" to "AB" to "AC" to subsequent character strings to "AI".

<Creating Setting Image>

The plurality of character strings extracted from the region "W" in the database 300 as described above is allocated in the display screen of the liquid crystal display unit 4. In other words, first, as illustrated in FIG. 8A, an initial setting screen 4A for appropriately performing edition is displayed on the liquid crystal display unit 4. On the initial setting screen 4A, setting images M1, M2, M3, and subsequent setting images related to each of a predetermined number of print labels "L" are displayed. At this point, at least each one (according to this example, two) block that has been previously determined is arranged in a label longitudinal direction in the setting image M1.

According to this example, two blocks BL1a, BL1b are arranged in the setting image M1. Between both blocks BL1a and BL1b, a block feed mark "K" is displayed. Such a setting image "M" (image corresponding to one print label "L") is appropriately set in one unit and referred to as "one page" hereinafter. According to this example, a cursor "C" is positioned at a head portion of the block BL1a of the above described setting image M1.

Further, two blocks BL2a, BL2b are arranged on the setting image M2 and, between both blocks BL2a and BL2b, the block feed mark "K" is displayed to make one page. Subsequent setting images of the setting image M3 are arranged in a similar manner (not illustrated).

In a state where the initial setting screen 4A as described above is displayed, when the operator appropriately gives an instruction for displaying the database via the keyboard unit 5, as illustrated in FIG. 8B, the liquid crystal display unit 4 displays the database display screen 4B including the database 300. On the database display screen 4B, by scrolling the screen as illustrated in FIG. 8B, all data contents of all records in the database 300 can be viewed. In this state, the operator specifies the region "W" as described above via the keyboard unit 5. FIG. 8B illustrates a state where, along the above described example, the region "W" including the character string "AA", the character string "AB", the character string "AC", and the subsequent character strings in the first field 320 is specified.

When the above described region "W" is specified, as illustrated in FIG. 8C, an allocation pattern selection screen 4C via which any one of a plurality of types of above described allocation patterns that have been prepared can be selected is displayed on the liquid crystal display unit 4.

As illustrated in FIG. 8C, according to this example, at an upper portion of the allocation pattern selection screen 4C, a message of "select allocation pattern" is displayed in a message column SM1. Further, at a lower portion thereof, the allocation patterns including "General", "Faceplate", "Cable Wrap", "Cable Flag" (including two patterns that can be selected as described below), "Patch panel", and "Punch Block" are displayed selectively with a check box (indicated with circles in FIG. 8C). According to this example in FIG. 8C, the "General" pattern is checked, which indicates a state of being selected. A specific allocation mode of each allocation pattern will be described below.

Figure 9A:
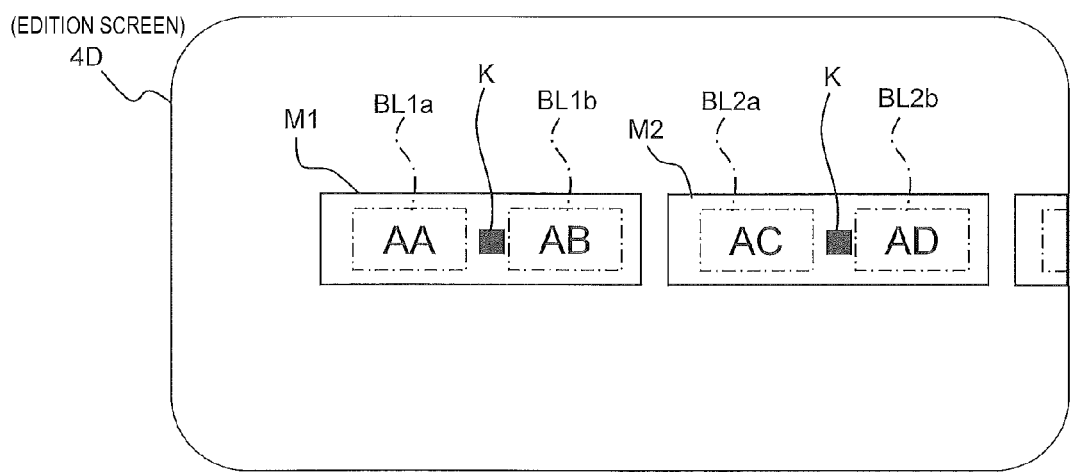
FIG. 9A is an illustration indicating an edition screen displayed on the liquid crystal display unit.

As described above, when the allocation pattern is selected via the allocation pattern selection screen 4C, to the blocks BL1a, BL1b, BL2a, and subsequent blocks in the setting images M1, M2, and the subsequent setting images indicated in the initial setting screen 4A illustrated in the above described FIG. 8A, the plurality of character strings in the region "W" specified via the database display screen 4B illustrated in the above described FIG. 8B are allocated along the allocation pattern selected via the allocation pattern selection screen 4C illustrated in the above described FIG. 8C. FIG. 9A illustrates an edition screen 4D displayed on the liquid crystal display unit 4 after the allocation has been performed as described above. According to the above described example, along this example, along the "General" pattern, the example describes that the character string "AA", the character string "AB", the character string "AC", and the subsequent character strings are allocated in a block unit. In other words, in the "General" pattern, two blocks are provided for each page (according to this example, the number of the blocks for each page is the same as that of the initial setting screen 4A illustrated in the above described FIG. 8A, however, when the number of the blocks for each page is different from that of the initial setting screen 4A, at this timing, the number of the blocks is automatically switched and displayed). In other words, the character strings "AA", "AB" are allocated as the print object respectively to the above described blocks BL1a, BL1b set for the above described first setting image M1 (such allocation of the character string to the block is also appropriately referred to as "flow in"). Further, to the blocks BL2a, BL2b set for the second setting image M2, the subsequent character strings "AC", "AD" of the above described character strings are allocated as the print object.

Figure 9B:
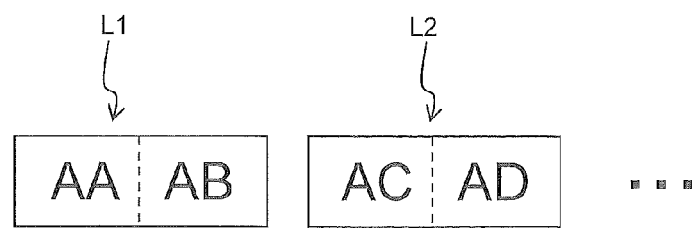
FIG. 9B is a plan view of print labels after print formation.

FIG. 9B illustrates an example of the print label finally produced by flow-in of the above described character string using the edition screen 4D (however, in this case, for easier understanding, after the flow-in has been performed from the database 300, the character string is indicated without the data content edited. However, actually, by performing the edition, each character string that is the data content can be corrected and changed. The same processing can be performed on FIGS. 10A-10D, FIGS. 11A-11C, FIGS. 16A-16D, and FIGS. 17A-17C.) According to this example, first, a print label L1 on which the character strings "AA", "AB" are printed and formed corresponding to the above described setting image M1 is produced. Next, a print label L2 on which the character strings "AC", "AD" are printed and formed corresponding to the above described setting image M2 is produced (subsequent print labels are produced in a similar manner, and descriptions with reference to diagrams will not be repeated.)

<Various Types of Allocation Patterns>

With reference to FIGS. 10A-10C, and FIGS. 11A-11C, the various types of allocation patterns described above will be described.

FIG. 10A illustrates the above described "General" pattern. As described above, in this pattern, two blocks are provided for each page. The character strings are allocated in a block unit such that the blocks have contents different from one another. The character strings "AA", "AB" are allocated as the print object respectively to the blocks BL1a, BL1b in the first setting image M1. The character strings "AC", "AD" are allocated as the print object respectively to the blocks BL2a, BL2b in the second setting image M2. As a result, the print label L1 including the character strings "AA", "AB", the print label L2 including the character strings "AC", "AD", and the subsequent print labels conducted in a similar manner are produced. When the above described allocation is performed, if too many character strings are specified by the above described region "W" to be allocated in each block in the setting images M1, M2, M3, and the subsequent setting images that have been previously set via the initial setting screen 4A, the block is appropriately added in a page unit. With this arrangement, the setting images M1, M2, M3, and the subsequent setting images in the number capable of allocating all character strings are newly set on the edition screen (the subsequent images are conducted in a similar manner).

FIG. 10B illustrates the above described "Faceplate" pattern. In this pattern, each one block is provided for each page, and the character strings are allocated in a block unit such that the blocks (in other words, the pages) have the contents different from one another. The character string "AA" is allocated as the print object to the block BL1a in the first setting image M1, and the character string "AB" is allocated as the print object to the block BL2a in the second setting image M2. Further, the character string "AC" is allocated as the print object to the block BL3a in the third setting image M3, and the character string "AD" is allocated as the print object to the block BL4a in the fourth setting image M4 (the subsequent setting images are conducted in a similar manner). As a result, the print label L1 including the character string "AA", the print label L2 including the character string "AB", the print label L3 including the character string "AC", the print label L4 including the character string "AD", and the subsequent print labels conducted in a similar manner are produced.

FIG. 10C indicates the above described "Cable Wrap" pattern. In this pattern, each page includes one block, and the character strings are allocated in a block unit such that the blocks (in other words, the pages) have the contents different from one another. The character string "AA" is allocated as the print object to the block BL1a in the first setting image M1, and the character string "AB" is allocated as the print object to the block BL2a in the second setting image M2. Further, the character string "AC" is allocated as the print object to the block BL3a in the third setting image M3, and the character string "AD" is allocated as the print object to the block BL4a in the fourth setting image M4 (the subsequent setting images are conducted in a similar manner). In this pattern, the print label is formed by arranging same character strings in a plurality of rows (according to this example, two rows) using the character string of each block, and rotating a direction of a text of the character string by 90° to a left side. In other words, based on one character string "AA" of the block BL1a, the print label L1 including two character strings "AA", "AB" (the text is directed to the left by 90°) is produced. In a similar manner, the print label L2 including two character strings "AB", "AB" (the text is directed to the left by 90°) based on the one character string "AB" of the block BL2a, the print label L3 including two character strings "AC", "AC" (the text is directed to the left by 90°) based on the one character string "AC" of the block BL3a, the print label L4 including two character strings "AD", "AD" (the text is directed to the left by 90°) based on the one character string "AD" of the block BL4a, and the subsequent print labels conducted in a similar manner are produced.

FIG. 10D illustrates a first pattern of the above described "Cable Flag" pattern (a second pattern will be described below). This pattern provides each one block for each page. The character string "AA" is allocated as the print object to the block BL1a in the first setting image M1, and the character string "AB" is allocated as the print object to the block BL2a in the second setting image M2. Further, the character string "AC" is allocated as the print object to the block BL3a in the third setting image M3, and the character string "AD" is allocated as the print object to the block BL4a in the fourth setting image M4 (the subsequent setting images are conducted in a similar manner). In this pattern, the print label is formed that includes the same character strings in the plurality of rows (according to this example, two rows) using the character string of each block. In other words, the print label L1 including the two character strings "AA", "AA" based on the one character string "AA" of the block BL1a, the print label L2 including the two character strings "AB", "AB" based on the one character string "AB" of the block BL2a, and the subsequent print labels conducted in a similar manner are produced. As described above, of the "Cable Flag" pattern, in the first pattern, on the plurality of character strings included in the above described region "W", the allocation is performed such that the print object has the same print content corresponding to all blocks BL1a (or BL2a, BL2b, and the subsequent blocks) in the setting image M1 (or M2, M3, and the subsequent setting images), and still has the different content for each of the print labels L1, L2, L3, and subsequent print labels from one another.

Figure 11A:
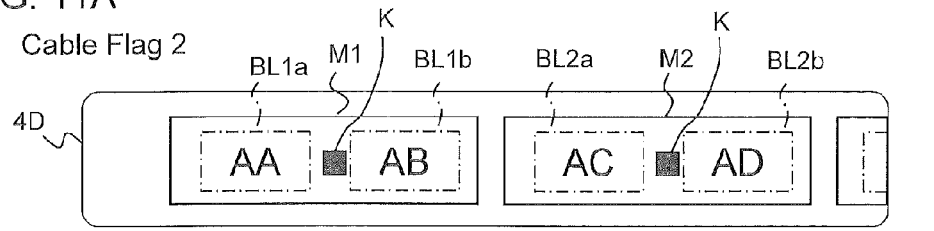
FIG. 11A is an illustration indicating a various type of allocation pattern.

FIG. 11A illustrates the second pattern of the above described "Cable Flag" pattern. As to, when the "Cable Flag" is checked via the allocation pattern selection screen 4C illustrated in the above described FIG. 8C, whether the above described first pattern or the second pattern is selected, for example, it may be selected in association with other appropriate print setting (not illustrated) or it may be selected according to detection of a type of a cartridge 11 mounted to the cartridge holder 12 or attribute of each tape included in the cartridge 11. In this pattern, two blocks are provided for each page, and the character strings are allocated in a block unit such that the two blocks have the contents different from each other. The character strings "AA", "AB" are allocated as the print object respectively to the blocks BL1a, BL1b in the first setting image M1, and the character strings "AC", "AD" are allocated as the print object respectively to the blocks BL2a, BL2b in the second setting image M2 (the subsequent setting images are conducted in a similar manner). As a result, the print label L1 including the character strings "AA", "AB", the print label L2 including the character strings "AC", "AD", and the subsequent print labels conducted in a similar manner are produced.

Figure 11B:
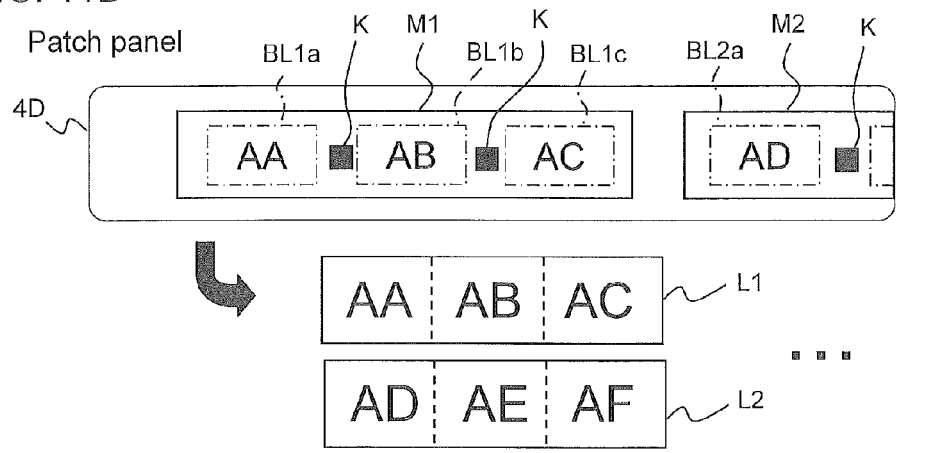
FIG. 11B is an illustration indicating a various type of allocation pattern.

FIG. 11B illustrates the above described "Patch panel" pattern. In this pattern, a plurality of (according to this example, three) blocks is provided for each page, and the character strings are allocated in a block unit such that the blocks have the contents different from one another. The character strings "AA", "AB", "AC" are allocated as the print object respectively to the blocks BL1a, BL1b, BL1c in the first setting image M1, and the character strings "AD", "AE", "AF" (a part of the character strings are not illustrated) are allocated as the print object respectively to the blocks BL2a, BL2b, BL2c in the second setting image M2 (the subsequent setting images are conducted in a similar manner). As a result, the print label L1 including the character strings "AA", "AB", "AC", the print label L2 including the character strings "AD", "AE", "AF", and the subsequent print label conducted in a similar manner are produced. In other words, in the "Patch panel" pattern, one page includes a unit of the appropriate plurality of blocks (according to this example, three blocks), and the print label is produced by each two pages.

Figure 11C:
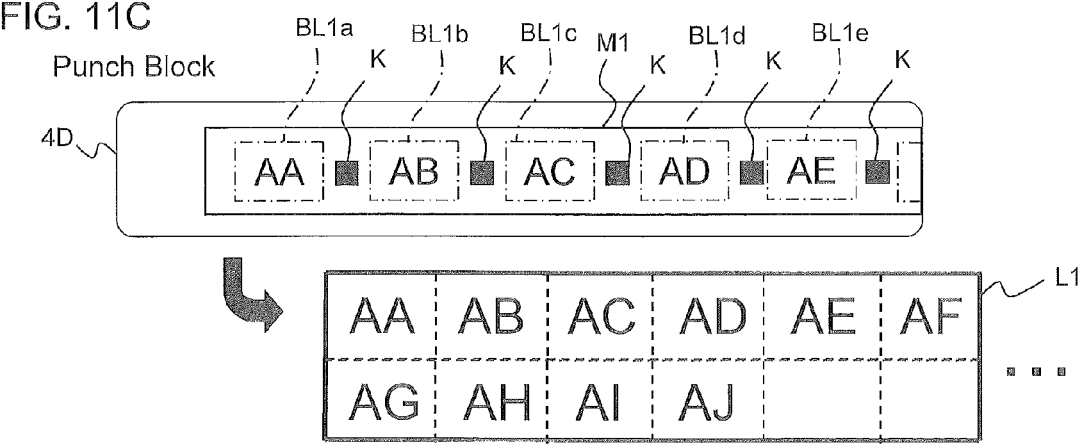
FIG. 11C is an illustration indicating a various type of allocation pattern.

FIG. 11C illustrates the above described "Punch Block" pattern. In this pattern, a plurality (according to this example, ten) of blocks are provided for each page, and the character strings are allocated in a block unit such that the blocks have the contents different from one another. The character strings "AA", "AB", "AC", "AD", "AE", "AF", "AG", "AH", "AI", "AJ" (a part of the character strings is not illustrated) are allocated as the print object respectively to the blocks BL1a, BL1b, BL1c, BL1d, BL1e, BL1f, BL1g, BL1h, BL1i, BL1j (a part of the blocks is not illustrated) in the first setting image M1 (the subsequent setting images are conducted in a similar manner). As a result, the character strings "AA", "AB", "AC", "AD", "AE", "AF" are formed in an upper stage, "AG", "AH", "AI", "AJ" are formed in a lower stage, and then the print label L1 including the printed upper and lower stages, and the subsequent print labels conducted in a similar manner are produced.

<Control Step>

To realize the above described steps, the control step executed by the CPU 74 of the label producing apparatus 1 will be described using flowcharts illustrated in FIGS. 12, 13, 14.

Figure 12:
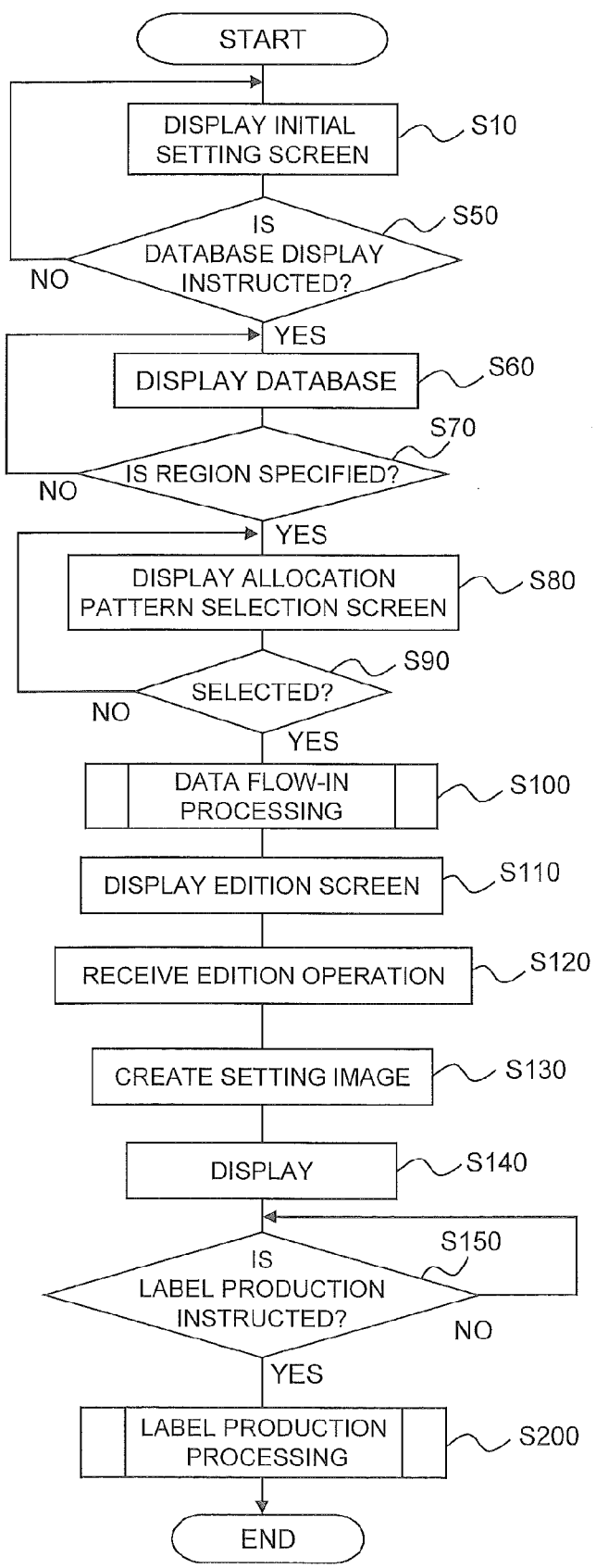
FIG. 12 is a flowchart illustrating control steps executed by a CPU.

In FIG. 12, processing illustrated in the flow is started when a power source of the label producing apparatus 1 is turned on, for example.

In step S10, the CPU 74 outputs a control signal to the liquid crystal display unit 4 and causes the liquid crystal display unit 4 to display the above described initial setting screen 4A including a predetermined number of the blocks (according to the above described example, BL1a, BL1b, BL2a, BL2b, and the subsequent blocks), and then the processing proceeds to step S50.

In step S50, the CPU 74 determines whether the operator has instructed the above described database display via the keyboard unit 5. When the database display has not been instructed, the determination in step S50 is not satisfied (NO, in step S50), and thus the processing returns to step S10 to repeatedly perform the same steps. When the display of the database has been instructed, the determination in step S50 is satisfied (YES, in step S50), and thus the processing proceeds to step S60.

In step S60, the CPU 74 outputs the control signal to the liquid crystal display unit 4, and causes the above described database display screen 4B to display the content of the database 300 stored in the EEPROM 77 (refer to FIG. 8B). Step S60 corresponds to a database display step according to each claim, and further the CPU 74 executing step S60 functions as a database display control portion according to each claim.

In step S70, based on the above described database 300, the CPU 74 determines whether the operator has specified the region via the keyboard unit 5, in other words, the operator has specified the above described region "W" in the above described database display screen 4B (refer to FIG. 8B). When the region has not been specified, the determination in step S70 is not satisfied (NO, in step S70), and thus the processing returns to step S60 to repeatedly perform the same steps. When the region has been specified, the determination in step S70 is satisfied (YES, in step S70), and then the processing proceeds to step S80. Step S70 corresponds to a region specification reception step according to each claim, the CPU 74 executing step S70 functions as a region-specification reception portion according to each claim.

In step S80, the CPU 74 outputs the control signal to the liquid crystal display unit 4, and causes the liquid crystal display unit 4 to display the above described allocation pattern selection screen 4C (refer to FIG. 8C), and then the processing proceeds to step S90.

In step S90, in the allocation pattern selection screen 4C displayed in the above described step S80, the CPU 74 determines whether the operator has selected one pattern (according to the above described example, whether any one of the "General", "Faceplate", "Cable Wrap", "Cable Flag", "Patch panel", "Punch Block" has been selected). When the pattern has not been selected, the determination in step S90 is not satisfied (NO, in step S90), and the processing returns to step S80 to repeatedly perform the same steps. When the pattern has been selected, the determination in step S90 is satisfied (YES, in step S90), and thus the processing proceeds to step S100. This step S90 corresponds to a rule specification reception step according to each claim.

In step S100, the CPU 74 allocates the plurality of character strings in the region "W" specified in the above described step S70 to each of the blocks BL1a, BL1b, BL2a, and the subsequent blocks of each of the setting images M1, M2 and the subsequent setting images illustrated in the initial setting screen 4A in the above described step S10 along the allocation pattern selected in the above described step S90 (refer to FIG. 9A, FIGS. 10A-10C, and FIGS. 11A-11C. Details will be described below.) Step S100 corresponds to a print object arrangement step according to each claim, and the CPU 74 executing step S100 functions as a print object arrangement portion.

Subsequently, in step S110, the CPU 74 outputs the control signal to the liquid crystal display unit 4, and causes the above described edition screen 4D to display each setting image M1, M2, M3, and the subsequent setting images on which the character string is allocated (the data is flown in) in the above described step S100 (refer to FIG. 9). The edition screen 4D and the above described initial setting screen 4A correspond to an edition screen according to each claim. Step S110 and the above described step S10 correspond to the edition screen display step according to each claim, and the CPU 74 executing step S10 and the above described step S110 functions as an edition screen display control portion. Subsequently, the processing proceeds to step S120.

In step S120, the CPU 74 receives an edition operation (change, deletion, addition, and so on of a text content) on the character strings (according to the above described example, character strings "AA2", AB", "C", and the subsequent character strings of the blocks BL1a, BL1b, BL2a, BL2b, and the subsequent blocks) of each block of the above described setting images M1, M2, and the subsequent setting images that are allocated in the above described step S100 via the keyboard unit 5 and displayed on the edition screen 4D in step S110.

Subsequently, in step S130, the CPU 74 creates the above described setting images M1, M2, and the subsequent setting images reflecting the edition operation received in the above described step S120, and then the processing proceeds to step S140.

In step S140, the CPU 74 outputs the control signal to the liquid crystal display unit 4 and causes the above described edition screen 4D to display edited setting images M1, M2, M3, and the subsequent edited setting images that have been created in the above described step S130, and then the processing proceeds to step S150.

In step S150, the CPU 74 determines whether the operator has input a predetermined label production instruction via the keyboard unit 5. Until the label production instruction is input, a determination in step S150 is not satisfied (NO, in step S150), and thus the processing waits in a loop. When the label production instruction is input, the determination in step S150 is satisfied (YES, in step S150), and then the processing proceeds to step S200.

In step S200, the CPU 74 associates with and controls the above described platen roller 24 and the above described thermal head 23 via the thermal head driving circuit 61 and the motor driving circuit 63 to create the print label corresponding to each of edited setting images M1, M2, M3, and the subsequent edited setting images displayed on the edition screen 4D in the above described step S140, and then the processing illustrated in the flow is ended.

In any display phase in each of the above described steps, by the control by the CPU 74, when an escape key "Esc" on the keyboard 5 is pressed, for example, processing described below can be ended.

<Data Flow-In Processing>

Figure 13:
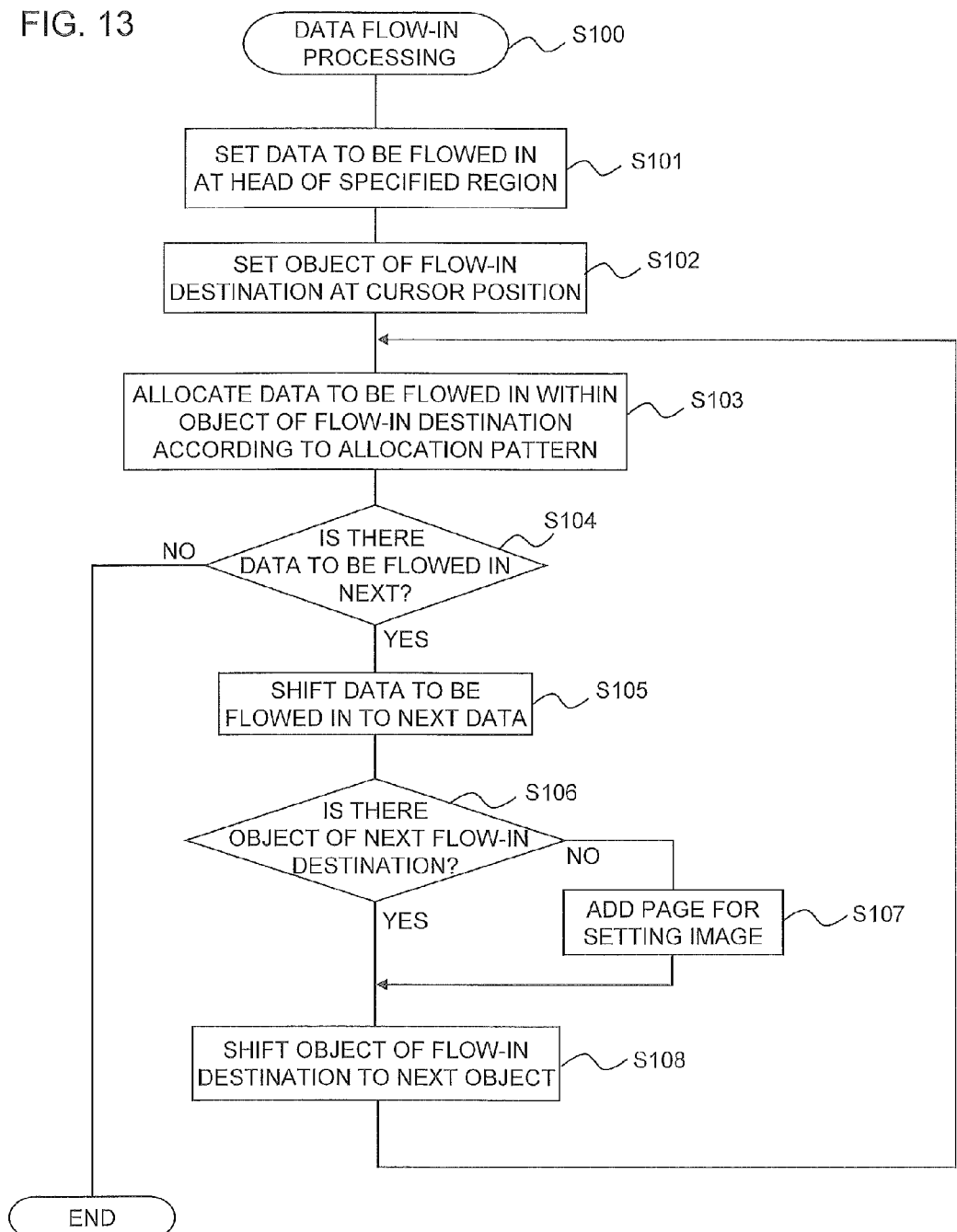
FIG. 13 is a flowchart illustrating detailed steps of data flow-in processing in step S100.

With reference to FIG. 13, a detailed step of the data flow-in processing in the above described step S100 will be described.

In FIG. 13, in step S101, the CPU 74 sets flow-in target data to be flowed in (to be allocated), of all data (according to the above described example, character string data in each section) included in the region "W" specified in the above described step S90 in the database 300 to data of a head portion (e.g., upper left portion normally) in the region "W". According to this example illustrated in the above described FIG. 7, the flow-in target data is the character string "AA".

In step S102, the CPU 74 sets a flow-in destination object, which is to be a flow-in (to be allocated) destination, to an object (according to this example in the above described FIG. 8A, block BL1a in the setting image M1) at a position where a cursor C is located in the initial setting screen 4A displayed in the above described step S10.

In step S103, the CPU 74 allocates the flow-in target data set in the above described step S101 into the flow-in destination object set in the above described step S102 along the allocation pattern selected in the above described step S90.

In step S104, the CPU 74 determines whether there is next flow-in target data. When, by repeatedly performing the steps described below, the flow-in of the character string data into the above described region "W" is all ended (according to FIG. 7B, the flow-in up to the character string "AI" is ended), and then when there is no more next flow-in target data, a determination in step S104 is not satisfied (NO, in step S104), and this routine is ended. When there is still the next flow-in target data, a determination in step S104 is satisfied (YES in step S104), and then the processing proceeds to step S105.

In step S105, the CPU 74 shifts the above described flow-in target data to the next data (the next data is set as the flow-in target). According to the above described example, each time step S105 is performed, the flow-in target data is sequentially shifted, for example, the character string "AA" to the character string "AB" to the character string "AC" to the subsequent character strings to the character string "AI" (in a longitudinal direction in FIG. 7B).

In step S106, the CPU 74 further determines whether there is next flow-in destination object in the above described initial setting screen 4A. By the steps described below that have been repeatedly performed, the flow-in of the character strings data into all blocks in each of the setting images M1, M2, and the subsequent setting image data displayed on the above described initial setting screen 4A is ended, and then when there is no more next flow-in destination object, a determination in step S106 is not satisfied (NO, in step S106), and then the processing proceeds to step S107. When there is the next flow-in destination object, a determination in step S106 is satisfied (YES, in step S106), and then the processing proceeds to step S108.

In step S107, the CPU 74 adds the setting image for a new one page required to flow in an updated flow-in target data that has shifted in the above described step S105 to the setting images M1, M2, and the subsequent setting images in the initial setting screen 4A displayed in step S101. Subsequently, the processing proceeds to step S108.

In step S108, the CPU 74 shifts the flow-in destination object in the above described initial setting screen 4A to the next object (the next object is set as the flow-in destination object). For example, according to the above described FIG. 9A, FIG. 10A, each time step S108 is performed, the block is sequentially shifted in a tape-length direction, for example, the block BL1a to the block BL1b to the block BL2a to the subsequent blocks. Then, the processing returns to step S103, and the same above described steps are repeatedly performed until the determination in step S104 is no more satisfied.

<Label Production Processing>

Figure 14:
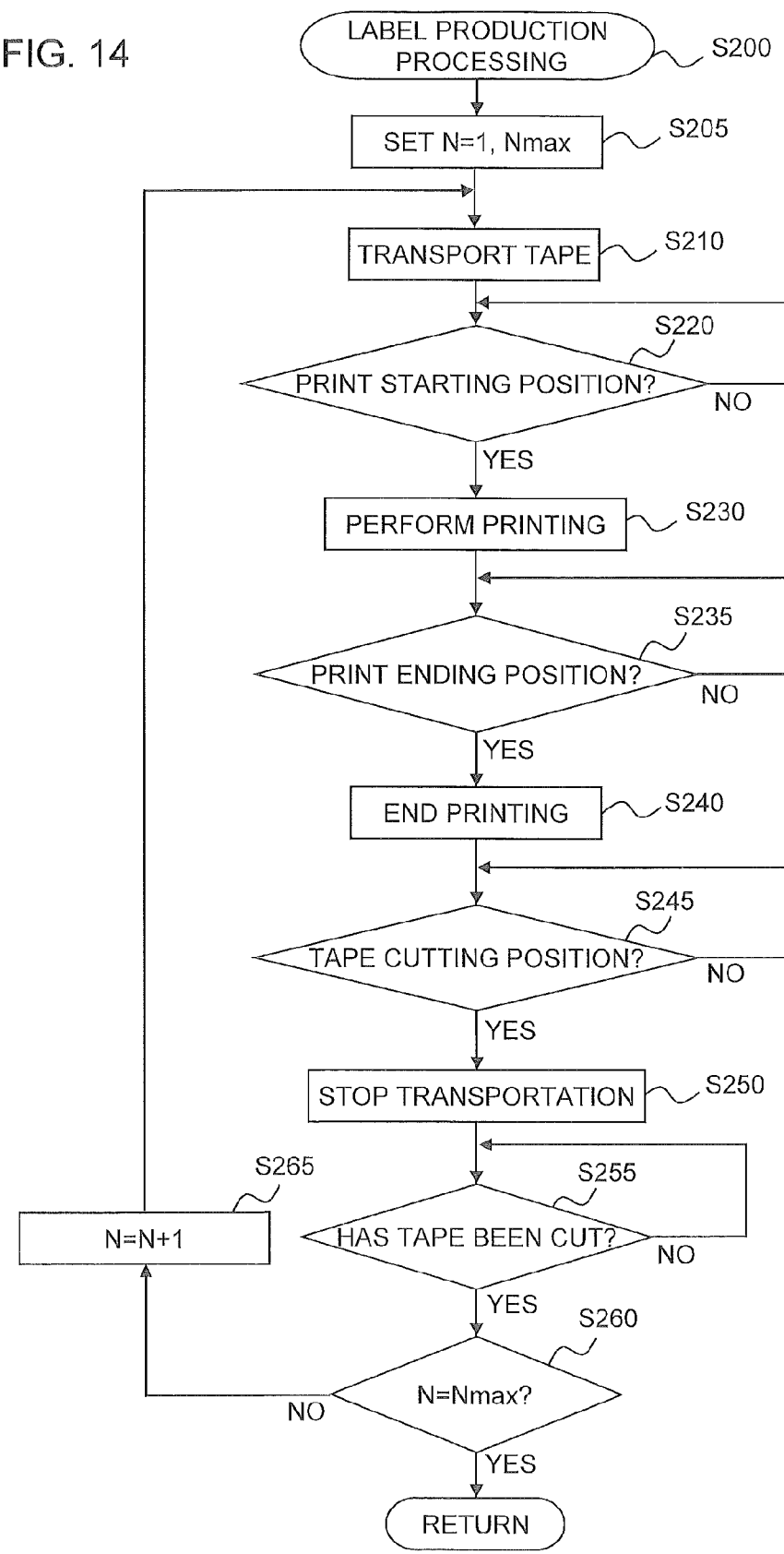
FIG. 14 is a flowchart illustrating detailed steps of label production processing in step S130.

With reference to FIG. 14, detailed steps of the label production processing in the above described step S200 will be described.

In FIG. 14, first, in step S205, the CPU 74 sets to "1" a value of a variable "N" related to the number of the print labels to be generated. Further, based on an appropriate operation (input operation of the number of the print labels to be generated) by the operator via the keyboard unit 5, the above described variable "N" is set to a maximum value Nmax.

In step S210, the CPU 74 outputs the control signal to the motor driving circuit 63 to start driving of a motor 63a. With this arrangement, the gear is rotated and driven to start rotation of the platen roller 24 and the pressing roller 26, and then to start feeding the cover film, the base tape, and the label tape with print (hereinafter appropriately referred to simply as "cover film and so on") is started.

In step S220, the CPU 74 determines by a known method whether a position of the cover film and so on in a feeding direction has reached a predetermined printing start position. Until it reaches the printing start position, a determination in step S220 is not satisfied (NO, in step S220), and thus the processing returns to the above described step S210 to repeatedly perform the same steps. When it has reached the printing start position, the determination in step S220 is satisfied (YES, in step S145), and then the processing proceeds to step S230.

In step S230, the CPU 74 outputs to the thermal head driving circuit 61 the control signal (print data corresponding to the above described setting images M1, M2, M3, and the subsequent setting images) corresponding to the label in sequence corresponding to the value of the variable "N" at this point. With this arrangement, the thermal head 23 is driven in response to the print data, and the print object (according to the above described example, character string) corresponding to the print data on the cover film is started to be formed.

In step S235, the CPU 74 determines by the known method whether the position of the cover film and so on in the feeding direction has reached a predetermined printing end position. Until it reaches a predetermined printing end position, a determination in step S235 is not satisfied (NO, in step S235), and thus the processing waits in a loop. When the position of the cover film and so on reaches the predetermined printing end position, the determination in step S235 is satisfied (YES, in step S235), and then the processing proceeds to step S240.

In step S240, the CPU 74 outputs the control signal to the thermal head driving circuit 61 to stop driving the thermal head 23, and then ends the above described printing.

In step S245, the CPU 74 determines by the known method whether the position of the above described label tape with print in the feeding direction has reached a tape cutting position. Until it reaches the tape cutting position, a determination in step S245 is not satisfied (NO, in step S245), and thus the processing waits in a loop. When it reaches the tape cutting position, the determination in step S245 is satisfied (YES, in step S245), and then the processing proceeds to step S250.

In step S250, the CPU 74 outputs the control signal to the motor driving circuit 63 to stop driving the motor 63a. With this arrangement, the rotation of the platen roller 24 and the pressing roller 26 is stopped to stop feeding the cover film, the base tape, and the label tape with print.

In step S255, the CPU 74 determines whether the cutting operation lever 6 is operated to drive the cutter to cut the above described label tape with print. Until the label tape with print is cut, a determination in step S255 is not satisfied (NO, in step S255), and thus the processing waits in a loop. When the label tape with print is cut, the determination in step S255 is satisfied (YES, in step S255), and then the processing proceeds to step S260. When the label tape with print is cut, the print labels L1, L2, L3, and the subsequent print labels in sequence corresponding to the value of the variable "N" at this point are created.

In step S260, the CPU 74 determines whether the value of the variable "N" reaches the above described maximum value Nmax. Until the value of the variable "N" reaches the maximum value Nmax, a determination in step S260 is not satisfied (NO, in step S260), and then the processing proceeds to step S265. In step S265, after the CPU 74 adds "1" to the value of the variable "N", the processing returns to the above described step S210 to repeatedly perform the same steps. On the other hand, in step S260, when the value of the variable "N" reaches the maximum value Nmax, the determination in step S260 is satisfied (YES, in step S260), and thus the routine is ended. With the above described steps, all pieces of the print labels L1, L2, L3, and the subsequent print labels desired by the operator can be created.

The present disclosure is not limited to the above described embodiments, however, various modifications and alterations of the disclosure may be made without departing from the spirit and the technical idea of the disclosure.

(1) When Region in Different Mode is Specified

When the region "W" in the above described database 300 is specified, a region "W'" may be specified over a plurality (according to this example, two) of fields as illustrated in FIG. 15A, for example, without being limited by a specification mode limited to one field as illustrated in the above described FIGS. 7A, 7B.

According to FIG. 15A, of the database 300, in the region "W'", the character strings "AA", "AB", "AC", "AD" in a first field 320 included respectively in the records having record numbers "001"-"004" and the character strings "B", "B", "B", "B" in a second field 330 are specified as the print label when the printing is formed. According to this example, the character strings in the region "W'" are extracted in an order from the character string "AA" to the character string "B" to the character string "AB" to the character string "B" to the character string "AC" to the character string "B" to the character string "AD" to the character string "B" to form a zigzag mode forwarding rightward, forwarding from the most right edge to the most left edge that is one stage lower, and further forwarding rightward in the database (in other words, such that the mode forwarding in the same record in an order along a direction in which a field number is increased is repeatedly forwarded in a direction in which a record number is increased, refer to broken-line arrows in FIG. 15B).

Also in such a region "W'", in a similar manner to the region "W" of the above described embodiment, the data may be extracted in the mode forwarding downward in the same field. In this case, for example, the character strings are extracted in an order of the character string "AA" to "the character string "AB" to the character string "AC" to the character string "AD" to the character string "B" to the character string "B" to the character string "B" to the character string "B".

According to a modification example, in a similar manner as described above, the plurality of character strings specified by the above described region "W'" on the data display screen 4B illustrated in FIG. 8B are each allocated to the blocks BL1a, BL1b, BL2a, and the subsequent blocks in each of the images M1, M2, and the subsequent images in the initial setting screen 4A illustrated in the above described FIG. 8A along the allocation pattern selected in the above described allocation pattern selection screen 4C.

<Various Types of Patterns>

An allocation mode when the above described various types of allocation patterns are adopted on the character strings in the above described region "W'" and a mode of the print label "L" to be created will be described with reference to FIGS. 16A-16D and FIGS. 17A-17C corresponding to FIGS. 10A-10D, FIGS. 11A-11C respectively.

<Various Types of Patterns>

FIG. 16A illustrates a case where, using the above described "General" pattern illustrated in FIG. 10A, the character strings in the above described region "W'" are allocated. In this pattern, each two blocks are provided for each page. The character strings are allocated in a block unit such that the blocks have the different content from each other. The character strings "AA", "B" are allocated as the print object respectively to the blocks BL1a, BL1b in the first setting image M1, and the character strings "AB", "B" are allocated as the print object respectively to the blocks BL2a, BL2b in the second setting image M2 (the subsequent setting images are conducted in a similar manner). As a result, the print label L1 including the character strings "AA", "B", the print label L2 including the character strings "AB", "B", and the subsequent print labels conducted in a similar manner are produced.

FIG. 16B illustrates a case where, using the above described "Faceplate" pattern illustrated in FIG. 10B, the character strings in the above described region "W'" are allocated. In this pattern, each one block is provided for each page, and the character strings are allocated in a block unit such that the blocks (in other words, the pages) have the different content from each other. The character string "AA" is allocated as the print object to the block BL1a in the first setting image M1, and the character string "B" is allocated as the print object to the block BL2a in the second setting image M2. Further, the character string "AB" is allocated as the print object to the block BL3a in the third setting image M3, and the character string "B" is allocated as the print object to the block BL4a in the fourth setting image M4 (the subsequent setting images will be conducted in a similar manner). As a result, the print label L1 including the character string "AA", the print label L2 including the character string "B", the print label L3 including the character string "AB", the print label L4 including the character string "B", and the subsequent print labels conducted in a similar manner are produced.

FIG. 16C illustrates a case where, using the above described "Cable Wrap" pattern illustrated in FIG. 10C, the character strings in the above described region "W'" are allocated. In this pattern, each one block is provided for each page, and the character strings are allocated in a block unit such that the blocks (in other words, the pages) have the different content from each other. The character string "AA" is allocated as the print object to the block BL1a in the first setting image M1, and the character string "B" is allocated as the print object to the block BL2a in the second setting image M2. Further, the character string "AB" is allocated as the print object to the block BL3a in the third setting image M3, and the character string "B" is allocated as the print object to the block BL4a in the fourth setting image M4 (the subsequent setting images are conducted in a similar manner). In this pattern, as described above, the print label is formed by arranging the same character strings in the plurality of rows (according to this example, two rows) using the character string of each block, and rotating a direction of a text of the character string by 90° to a left side. In other words, based on one character string "AA" of the block BL1a, the print label L1 including two character strings "AA", "AA" (the text is directed to the left by 90°) is produced. In a similar manner, the print label L2 including two character strings "B", "B" (the text is directed to the left by 90°) based on the one character string "B" of the block BL2a, the print label L3 including two character strings "AB", "AB" (the text is directed to the left by 90°) based on the one character string "AB" of the block BL3a, the print label L4 including two character strings "B", "B" (the text is directed to the left by 90°) based on the one character string "B" of the block BL4a, and the subsequent print labels conducted in a similar manner are produced.

FIG. 16D illustrates a case where, using the first pattern of the above described "Cable Flag" pattern illustrated in FIG. 10D, the character strings in the above described region "W'" are allocated. In this pattern, each one block is provided for each page. The character string "AA" is allocated as the print object to the block BL1a in the first setting image M1, and the character string "B" is allocated as the print object to the block BL2a in the second setting image M2. Further, the character string "AB" is allocated as the print object to the block BL3a in the third setting image M3, and the character string "B" is allocated as the print object to the block BL4a in the fourth setting image M4 (the subsequent setting images are conducted in a similar manner). In this pattern, as described above, the print label is formed by arranging the same character strings in the plurality of rows (according to this example, two rows) using the character string of each block. In other words, based on one character string "AA" of the block BL1a, the print label L1 including two character strings "AA", "AA", and the print label L2 including two character strings "B", "B" based on the one character string "B" of the block GL2a, and the subsequent print labels conducted in a similar manner are produced. As described above, in the first pattern of the "Cable Flag" pattern, the above described allocation is performed on the plurality of character strings included in the above described region "W'" such that the print objects have the same print content corresponding to all blocks BL1a (or BL2a, BL2b, and the subsequent blocks) in each setting image M1 (or M2, M3, and the subsequent setting images), and the print labels L1, L2, L3, and the subsequent print labels have the different print content from each other.

Figure 17A:
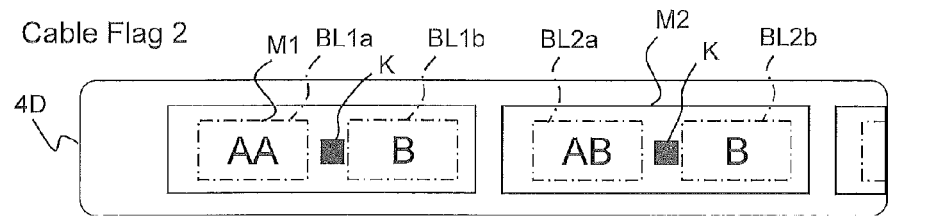
FIG. 17A is an illustration indicating a various type of allocation pattern.

FIG. 17A illustrates a case where, using the second pattern of the "Cable Flag" pattern illustrated in FIG. 11A, the character strings in the above described region "W'" are allocated. In this patter, two blocks are provided for each page, and as described above, the character strings are allocated in a block unit such that the blocks have the different content from each other. The character strings "AA", "B" are allocated as the print object to the blocks BL1a, BL1b in the first setting image M1, and the character strings "AB", "B" are allocated as the print object to the blocks BL2a, BL2b in the second setting image M2 (the subsequent setting images are conducted in a similar manner). As a result, the print label L1 including the character strings "AA", "B", the print label L2 including the character strings "AB", "B", and the subsequent print labels conducted in a similar manner are produced.

Figure 17B:
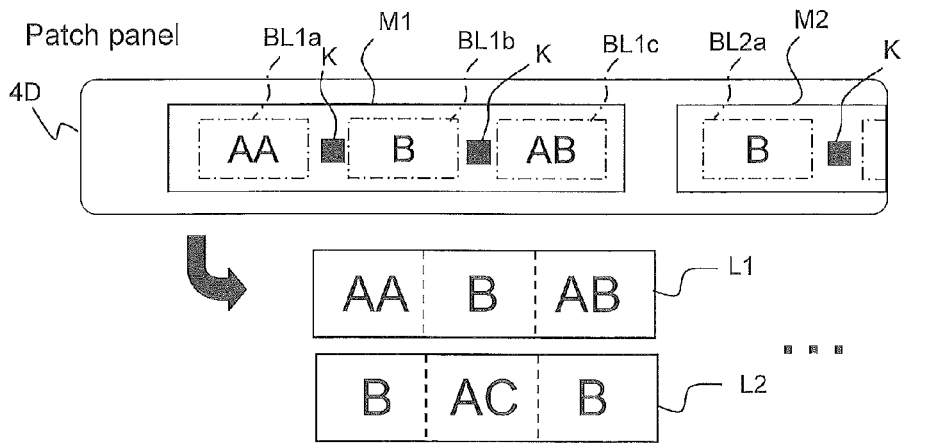
FIG. 17B is an illustration indicating a various type of allocation pattern.

FIG. 17B illustrates a case where, using the above described "Patch panel" pattern illustrated in FIG. 11B, the character strings in the above described region "W'" are allocated. In this pattern, as described above, a plurality (according to this example, three) of blocks are provided for each page, and the character strings are allocated in a block unit such that the blocks have the different content from each other. The character strings "AA", "B", "AB" are allocated as the print object to the blocks BL1a, BL1b, BL1c in the first setting image M1, and the character strings "B", "AC", "B" (a part of the pattern is not illustrated) are allocated as the print object to the blocks BL2a, BL2b, BL2c in the second setting image M2 (the subsequent setting images are conducted in a similar manner). As a result, the print label L1 including the character strings "AA", "B", AB", the print label L2 including the character strings "B", "AC", "B", and the subsequent print labels conducted in a similar manner are produced.

Figure 17C:
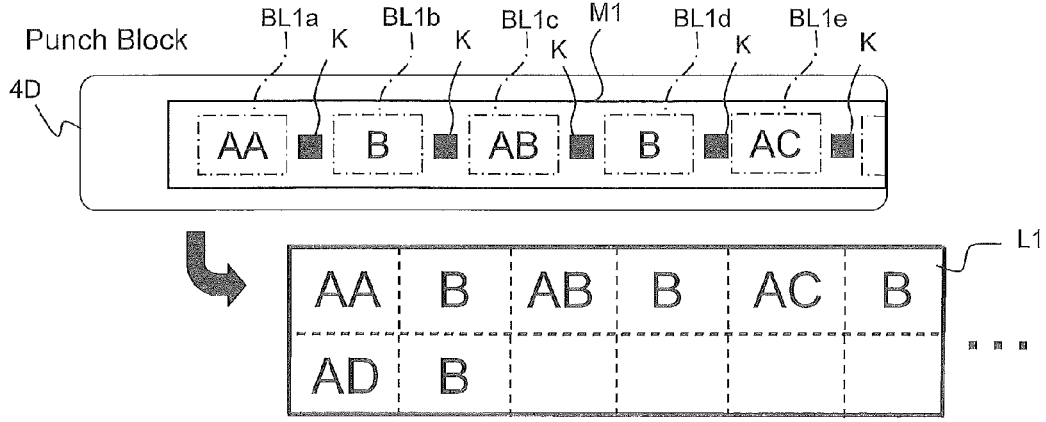
FIG. 17C is an illustration indicating a various type of allocation pattern.

FIG. 17C illustrates the above described the "Punch Block" pattern illustrated in FIG. 11C. In this pattern, as described above, a plurality (according to this example, ten) of blocks are provided for each page, and the character strings are allocated in a block unit such that the blocks have the different content from each other. The character strings "AA", "B", "AB", "B", "AC", "B", "AD", "B" (a part of the character strings is not illustrated) are allocated as the print object respectively to the blocks BL1a, BL1b, BL1c, BL1d, BL1e, BL1f, BL1g, BL1h, BL1i, BL1j (a part of the blocks is not illustrated) in the first setting image M1 (the subsequent setting images are conducted in a similar manner). As a result, the character strings "AA", "B", "AB", "B", "AC", "B" are formed in the upper stage, and "AD", "B" are formed in the lower stage, so that the print label L1 and subsequent print labels conducted in a similar manner having the two upper and lower stages are produced.

(2) Others

In the above described embodiments, a case where the label producing apparatus 1 corresponds to the printing processing apparatus according to each claim, and also where the control steps illustrated in the flow in FIGS. 12, 13, 14 are executed by the CPU 74 is described as an example, however, the embodiment is not limited to the cases. More specifically, the present disclosure may be adopted to a configuration in which, via the display device including the display, the operation device including the mouse and the keyboard, the storage device including the memory, an operation terminal including a personal computer including the CPU, the printer including the above described printing device and the above described feeder is operated to produce the print labels using the print-receiving tape. In this case, the above described operation terminal corresponds to the printing processing apparatus according to each claim, the storage device of the above described operation terminal stores the above described database 300, and the above described CPU executes control steps illustrated in the flow in FIGS. 12, 13, 14 to perform the above described processing related to the production of the above described print labels, thereby obtaining the similar effects described above.

Further, as above described, as the printing processing apparatus and the printer, the print label production device for performing the desired printing on the print print-receiving tape to produce the print label is described as an example, however, the present disclosure is not limited to the printing processing apparatus and the printer. In other words, the present disclosure may be adopted to a tape print device for creating a print tape (corresponding to the printed matter) that does not have viscosity like a label. This case also obtains the similar effects. Further, as an example of the printing processing apparatus and the printer, when the present disclosure is adopted to a normal printer for forming images and printing characters on a print sheet to be printed in size of, for example, A4, A3, B4, and B5, and a portable printer driven by a buttery power source.

The arrows illustrated in the above described FIG. 6 indicate examples of flows of signals, and thus do not limit flow directions of the signals.

The flowchart illustrated in FIGS. 12, 13, 14 do not limit the steps illustrated in the present disclosure, but addition and deletion of the steps or change of orders may be made without departing from the spirit and the technical idea of the disclosure.

Further, in addition to the embodiments described above, the method according to the above described embodiments may be appropriately combined and used.

Further additionally, the examples are not described herein, however, the present disclosure may be conducted with various types of modifications in a scope without departing from the spirit.

What is claimed is:

1. A non-transitory computer-readable recording medium, storing a printed matter production processing program for executing steps on a computing device disposed in a printing processing apparatus that includes a display device, an operation device, and a memory storing database including a plurality of records in which character string data is allocated to each of a plurality of fields and performs print of at least one of a desired print object on a print-receiving tape to perform processing for creating a printed matter, said steps comprising:

an edition-screen display step for controlling said display device to display an edition screen for receiving an input operation of said print object to be arranged in each of at least one block that can be set along a tape-length direction with respect to one said printed matter;

a database display step for controlling said display device to display said database that is stored in said memory, the database including said plurality of records;

a region-specification reception step for, in said database displayed in said database display step, receiving specification of a character-string including region including a plurality of character strings to be allocated as said print object related to a plurality of said printed matters on said edition screen; and a print-object arrangement step for arranging said print object related to each of said plurality of printed matters on said edition screen by allocating the plurality of character strings included in said character-string including region, the specification of which has been received in the region-specification reception step, to each of said at least one block related to said plurality of printed matters in accordance with a desired allocation rule.

2. The recording medium according to claim 1, wherein:
said computing device is further caused to execute a rule-specification reception step for receiving specification of said allocation rule when allocating said plurality of character strings in said print-object arrangement step via said operation device, and in said print-object arrangement step, each of said plurality of character strings included in said character-string including region is allocated according to said allocation rule received in said rule-specification reception step.

3. The recording medium according to claim 2, wherein:
in said print-object arrangement step, said print object related to each of said plurality of printed matters is arranged on said edition screen by performing, on said plurality of character strings included in said character-string including region, said allocation by adopting said allocation rule in which print contents corresponding to all blocks related to each printed matter are set as print objects having a same content as one another and still set as print objects having different content from one another for each printed matter.

4. The recording medium according to claim 2, wherein:
in said print-object arrangement step, said print object related to each of said plurality of printed matters is arranged on said edition screen by performing, on said plurality of character strings included in said character-string including region, said allocation by adopting said allocation rule in which said print object having different contents from one another is set for each block.

5. The recording medium according to claim 2, wherein:
in said print-object arrangement step, when the number of said printed matters set on said edition screen displayed in said edition screen display step is not sufficient for allocating all character strings in said character-string including region, the specification of which has been received in said region-specification reception step, said printed matter in the number capable of allocating said all character strings are newly set on said edition screen.

6. A printer comprising:
a display device configured to perform desired display;
an operation device configured to input a desired operation;
memory configured to store a database including a plurality of records in which character string data is allocated to each of a plurality of fields;
a feeder configured to feed a print-receiving tape;
a printing head configured to perform printing of at least one desired print object on said print-receiving tape to be fed by said feeder to create a printed matter;
an edition screen display control portion configured to control said display device to display an edition screen for receiving an input operation of said at least one desired print object to be arranged in each of at least one block that can be set along a tape-length direction with respect to one of said printed matter;
a database display control portion configured to control said display device to display said database including said plurality of records stored in said memory;
a region-specification reception portion configured to, in said database displayed on said display device by control of said database display control portion, receive specification of a character-string including region including a plurality of character strings to be allocated as said print object related to a plurality of said printed matters on said edition screen; and
a print object arrangement portion configured to arrange said print object related to said plurality of printed matters on said edition screen by allocating the plurality of character strings included in said character-string including region, the specification of which has been received by said region-specification reception portion, to each of said blocks related to said plurality of printed matters in accordance with a desired allocation rule,
wherein said printer is configured to produce said plurality of printed matters in which the print objects are formed by means of an arrangement mode realized on said edition screen by said print object arrangement portion, by controlling said feeder and said printing head in coordination with each other.

* * * * *